United States Patent
Lee et al.

(10) Patent No.: US 8,345,535 B2
(45) Date of Patent: Jan. 1, 2013

(54) METHOD AND APPARATUS FOR GENERATING RANGING PREAMBLE CODE IN WIRELESS COMMUNICATION SYSTEM

(75) Inventors: Hyun Woo Lee, Seoul (KR); Yeong Hyeon Kwon, Seoul (KR); Han Gyu Cho, Seoul (KR); Jin Sam Kwak, Seoul (KR); Min Seok Noh, Seoul (KR)

(73) Assignee: LG Electronics Inc., Seoul (KR)

( * ) Notice: Subject to any disclaimer, the term of this patent is extended or adjusted under 35 U.S.C. 154(b) by 314 days.

(21) Appl. No.: 12/834,826

(22) Filed: Jul. 12, 2010

(65) Prior Publication Data

US 2011/0007627 A1  Jan. 13, 2011

Related U.S. Application Data

(60) Provisional application No. 61/225,100, filed on Jul. 13, 2009, provisional application No. 61/234,988, filed on Aug. 18, 2009, provisional application No. 61/235,697, filed on Aug. 21, 2009, provisional application No. 61/236,049, filed on Aug. 21, 2009, provisional application No. 61/258,213, filed on Nov. 5, 2009.

(30) Foreign Application Priority Data

Jun. 15, 2010 (KR) ........................ 10-2010-0056681

(51) Int. Cl.
*H04J 11/00* (2006.01)
(52) U.S. Cl. ......... 370/210; 370/320; 370/335; 370/342
(58) Field of Classification Search ................... 370/210, 370/320, 335, 342
See application file for complete search history.

(56) References Cited

U.S. PATENT DOCUMENTS

| | | | |
|---|---|---|---|
| 2007/0230600 A1* | 10/2007 | Bertrand et al. | 375/260 |
| 2010/0172299 A1* | 7/2010 | Fischer et al. | 370/328 |
| 2010/0210243 A1* | 8/2010 | Vujcic | 455/411 |

* cited by examiner

*Primary Examiner* — Ayaz Sheikh
*Assistant Examiner* — Andrew C Lee
(74) *Attorney, Agent, or Firm* — Lee, Hong, Degerman, Kang, Waimey

(57) ABSTRACT

A method and apparatus of generating a ranging preamble code in a wireless communication system is provided. A mobile station (MS) generates one of a plurality of ranging preamble codes, wherein the plurality of ranging preamble codes are based on a padded Zadoff-Chu (ZC) sequence to which a cyclic shift is applied in a unit of $N_{CS}$, where $N_{CS}$ is a function of a cyclic prefix (CP) length in a time domain.

18 Claims, 15 Drawing Sheets

METHOD AND APPARATUS FOR GENERATING RANGING PREAMBLE CODE IN WIRELESS COMMUNICATION SYSTEM

CROSS-REFERENCE TO RELATED APPLICATIONS

Pursuant to 35 U.S.C. 119(e), this application claims the benefit of priority of U.S. Provisional application No. 61/225,100 filed on Jul. 13, 2009, U.S. Provisional application No. 61/234,988 filed on Aug. 18, 2009, U.S. Provisional application No. 61/235,697 filed on Aug. 21, 2009, U.S. Provisional application No. 61/236,049 filed on Aug. 21, 2009, and U.S. Provisional application No. 61/258,213 filed on Nov. 5, 2009, and pursuant to 35 U.S.C. §119(a), this application also claims the benefit of earlier filing date and right of priority to Korean Patent application No. 10-2010-0056681 filed on Jun. 15, 2010, the contents of which are all hereby incorporated by reference herein in their entirety.

BACKGROUND OF THE INVENTION

1. Field of the Invention

The present invention relates to wireless communications, and more particularly, to a method and apparatus for generating a ranging preamble code in a wireless communication system.

2. Related Art

The institute of electrical and electronics engineers (IEEE) 802.16e standard was adopted in 2007 as a sixth standard for international mobile telecommunication (IMT)-2000 in the name of 'WMAN-OFDMA TDD' by the ITU-radio communication sector (ITU-R) which is one of sectors of the international telecommunication union (ITU). An IMT-advanced system has been prepared by the ITU-R as a next generation (i.e., $4^{th}$ generation) mobile communication standard following the IMT-2000. It was determined by the IEEE 802.16 working group (WG) to conduct the 802.16m project for the purpose of creating an amendment standard of the existing IEEE 802.16e as a standard for the IMT-advanced system. As can be seen in the purpose above, the 802.16m standard has two aspects, that is, continuity from the past (i.e., the amendment of the existing 802.16e standard) and continuity to the future (i.e., the standard for the next generation IMT-advanced system). Therefore, the 802.16m standard needs to satisfy all requirements for the IMT-advanced system while maintaining compatibility with a mobile WiMAX system conforming to the 802.16e standard.

Effective transmission/reception methods and utilizations have been proposed for a broadband wireless communication system to maximize efficiency of radio resources. An orthogonal frequency division multiplexing (OFDM) system capable of reducing inter-symbol interference (ISI) with a low complexity is taken into consideration as one of next generation wireless communication systems. In the OFDM, a serially input data symbol is converted into N parallel data symbols, and is then transmitted by being carried on each of separated N subcarriers. The subcarriers maintain orthogonality in a frequency dimension. Each orthogonal channel experiences mutually independent frequency selective fading, and an interval of a transmitted symbol is increased, thereby minimizing inter-symbol interference.

When a system uses the OFDM as a modulation scheme, orthogonal frequency division multiple access (OFDMA) is a multiple access scheme in which multiple access is achieved by independently providing some of available subcarriers to a plurality of users. In the OFDMA, frequency resources (i.e., subcarriers) are provided to the respective users, and the respective frequency resources do not overlap with one another in general since they are independently provided to the plurality of users. Consequently, the frequency resources are allocated to the respective users in a mutually exclusive manner. In an OFDMA system, frequency diversity for multiple users can be obtained by using frequency selective scheduling, and subcarriers can be allocated variously according to a permutation rule for the subcarriers. In addition, a spatial multiplexing scheme using multiple antennas can be used to increase efficiency of a spatial domain.

An uplink control channel can be defined for transmission of an uplink control signal. Examples of the uplink control channel are various such as a fast feedback channel, a hybrid automatic repeat request (HARQ) feedback channel, a sounding channel, a ranging channel, a bandwidth request channel, etc. The fast feedback channel carries feedback of a channel quality indicator (CQI) and/or multiple-input multiple-output (MIMO) information, and can be classified into a primary fast feedback channel and a secondary fast feedback channel. The HARQ feedback channel is a channel for transmitting an acknowledgement (ACK)/non-acknowledgement (NACK) signal as a response for data transmission. The sounding channel can be used as an uplink channel response for closed-loop MIMO transmission and uplink scheduling. The bandwidth request channel is a channel for requesting a radio resource for transmitting a control signal or uplink data to be transmitted by a mobile station (MS).

A ranging preamble code can be transmitted through a ranging channel. Various types of codes or sequences, such as a Zadoff-Chu (ZC) sequence, can be used as the ranging preamble code. Meanwhile, the lower the correlation between ranging preamble codes, the higher the detection capability of the ranging channel. Further, the greater the number of ranging preamble codes that maintain a low correlation, the higher the detection capability of the ranging channel.

Accordingly, there is a need for a method of using a greater number of codes or sequences having a low correlation as a ranging preamble code.

SUMMARY OF THE INVENTION

It is, therefore, an object of the present invention to provide a method and apparatus for generating a ranging preamble code in a wireless communication system.

In an aspect, a method of generating a ranging preamble code in a wireless communication system is provided. The method include generating one of a plurality of ranging preamble codes, wherein the plurality of ranging preamble codes are based on a padded Zadoff-Chu (ZC) sequence to which a cyclic shift is applied in a unit of $N_{CS}$, where $N_{CS}$ is a function of a cyclic prefix (CP) length in a time domain. $N_{CS}$ may be determined by the following equation $N_{CS}=G*N_{FFT}$, where G is a CP ratio which is a ratio of the CP length to a useful symbol duration, and $N_{FFT}$ is a fast Fourier transform (FFT) size. G may be one of ¼, ⅛, and ¹⁄₁₆ according to a frame structure. $N_{FFT}$ may be one of 512, 1024, and 2048 according to a bandwidth size. $N_{CS}$ may be equal to the CP length. The cyclic shift applied to the padded ZC sequence may be determined by the following equation $$\exp\left(-j\frac{2\pi \cdot k \cdot s_p \cdot N_{CS}}{N_{FFT}}\right), k=0, 1, \ldots, N_{RP}-1,$$

where $s_p$ is a cyclic shift index per root index, $N_{FFT}$ is an FFT size depending on a bandwidth, and $N_{RP}$ is a length of the padded ZC sequence. A ranging preamble code with an index p among the plurality of ranging preamble codes may be determined by the following equation $$x_p(n, k) = \exp\left(-j \cdot \pi\left(\frac{r_p(71 \cdot n + k)(71 \cdot n + k + 1)}{211} + \frac{2 \cdot k \cdot s_p \cdot N_{CS}}{N_{FFT}}\right)\right),$$

where $k = 0, 1, \ldots, N_{RP} - 1; n = 0, 1, 2,$ $r_p$ is a root index of the padded ZC sequence, $s_p$ is a cyclic shift index per root index, $N_{FFT}$ is an FFT size depending on a bandwidth, and $N_{RP}$ is a length of the ZC sequence. The length of the padded ZC sequence may be either 214 or 216. The method may further include receiving the ranging preamble code information, wherein the ranging preamble code information indicates the number of periodic ranging preamble codes. The ranging preamble code information may be broadcast. The method may further include transmitting the generated ranging preamble code to a base station through a ranging channel. The ranging channel may include 6 orthogonal frequency division multiplexing (OFDM) symbols and 72 consecutive subcarriers in a ranging subframe. The generated ranging preamble code may be mapped and repeated across 3 OFDM symbols in a ranging channel.

In another aspect, an apparatus for generating a ranging preamble code in a wireless communication system is provided. The apparatus include a radio frequency (RF) unit, and a processor, coupled to the RF unit, and configured to generate one of a plurality of ranging preamble codes, wherein the plurality of ranging preamble codes are based on a padded Zadoff-Chu (ZC) sequence to which a cyclic shift is applied in a unit of $N_{CS}$, where $N_{CS}$ is a function of a cyclic prefix (CP) length in a time domain. $N_{CS}$ may be determined by the following equation $N_{CS} = G*N_{FFT}$, where G is a CP ratio which is a ratio of the CP length to a useful symbol duration, and $N_{FFT}$ is a fast Fourier transform (FFT) size. G may be one of ¼, ⅛, and 1/16 according to a frame structure. $N_{FFT}$ may be one of 512, 1024, and 2048 according to a bandwidth size. $N_{CS}$ may be equal to the CP length.

DESCRIPTION OF EXEMPLARY EMBODIMENTS

A technology below can be used in a variety of wireless communication systems, such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented using radio technology, such as universal terrestrial radio access (UTRA) or CDMA2000. TDMA can be implemented using radio technology, such as global system for mobile communications (GSM)/general packet radio service (GPRS)/enhanced data rates for GSM evolution (EDGE). OFDMA can be implemented using radio technology, such as IEEE 802.11(Wi-Fi), IEEE 802.16 (WiMAX), IEEE 802-20, or evolved UTRA (E-UTRA). IEEE 802.16m is the evolution of IEEE 802.16e, and it provides a backward compatibility with an IEEE 802.16e-based system. UTRA is part of a universal mobile telecommunications system (UMTS). 3rd generation partnership project (3GPP) long term evolution (LET) is part of evolved UMTS (E-UMTS) using evolved-UMTS terrestrial radio access (E-UTRA), and it adopts OFDMA in downlink (DL) and SC-FDMA in uplink (UL). LTE-A (Advanced) is the evolution of 3GPP LTE.

IEEE 802.16m is chiefly described as an example in order to clarify the description, but the technical spirit of the present invention is not limited to IEEE 802.16e.

Figure 1:
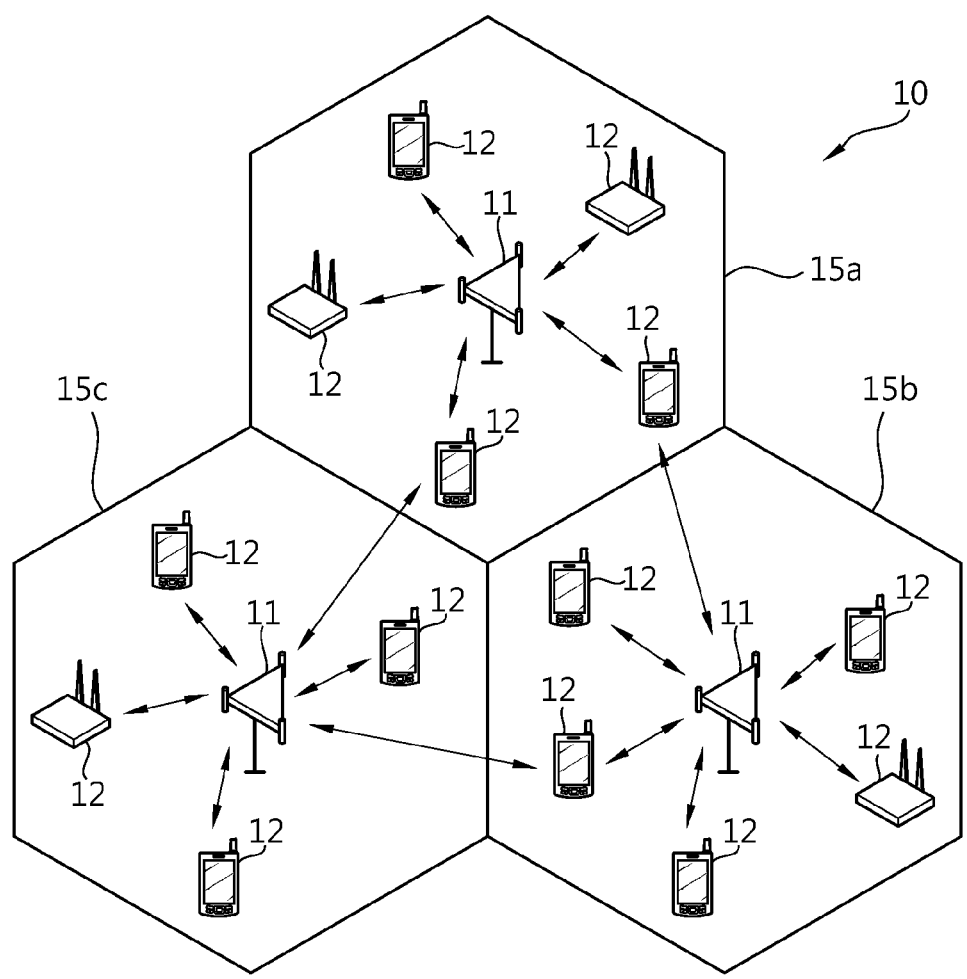
FIG. 1 shows a wireless communication system.

FIG. 1 shows a wireless communication system.
Referring to FIG. 1, the wireless communication system 10 includes one or more base stations (BSs) 11. The BSs 11 provide communication services to respective geographical areas (in general called 'cells') 15a, 15b, and 15c. Each of the cells can be divided into a number of areas (called 'sectors'). A user equipment (UE) 12 can be fixed or mobile and may be referred to as another terminology, such as a mobile station (MS), a mobile terminal (MT), a user terminal (UT), a subscriber station (SS), a wireless device, a personal digital assistant (PDA), a wireless modem, or a handheld device. In general, the BS 11 refers to a fixed station that communicates with the UEs 12, and it may be referred to as another terminology, such as an evolved-NodeB (eNB), a base transceiver system (BTS), or an access point.

The UE belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 2:
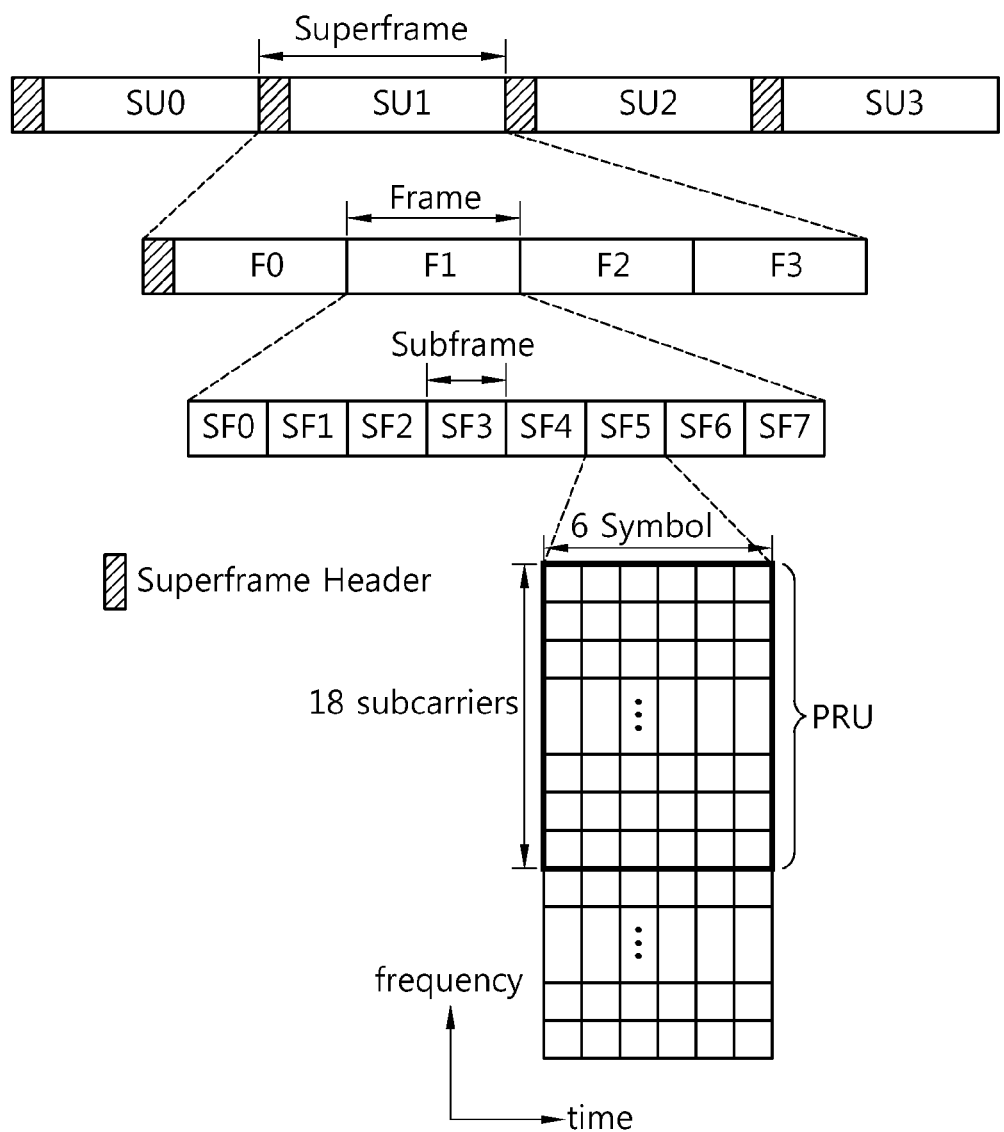
FIG. 2 shows an example of a frame structure.

FIG. 2 shows an example of a frame structure.

Referring to FIG. 2, a superframe (SF) includes a superframe header (SFH) and four frames F0, F1, F2, and F3. Each frame may have the same length in the SF. Although it is shown that each SF has a length of 20 milliseconds (ms) and each frame has a length of 5 ms, the present invention is not limited thereto. A length of the SF, the number of frames included in the SF, the number of SFs included in the frame, or the like can change variously. The number of SFs included in the frame may change variously according to a channel bandwidth and a cyclic prefix (CP) length.

The SFH can carry an essential system parameter and system configuration information. The SFH may be located in a first subframe of the SF. The SFH can be classified into a primary-SFH (P-SFH) and a secondary-SFH (S-SFH). The P-SFH and the S-SFH may be transmitted in every superframe.

One frame includes 8 subframes SF0, SF1, SF2, SF3, SF4, SF5, SF6, and SF7. Each subframe can be used for uplink or downlink transmission. One subframe includes a plurality of orthogonal frequency division multiplexing (OFDM) symbols in a time domain, and includes a plurality of subcarriers in a frequency domain. An OFDM symbol is for representing one symbol period, and can be referred to as other terminologies such as an OFDM symbol, an SC-FDMA symbol, etc., according to a multiple access scheme. The subframe can consist of 5, 6, 7, or 9 OFDM symbols. However, this is for exemplary purposes only, and thus the number of OFDM symbols included in the subframe is not limited thereto. The number of OFDM symbols included in the subframe may change variously according to a channel bandwidth and a CP length. A subframe type may be defined according to the number of OFDM symbols included in the subframe. For example, it can be defined such that a type-1 subframe includes 6 OFDM symbols, a type-2 subframe includes 7 OFDM symbols, a type-3 subframe includes 5 OFDM symbols, and a type-4 subframe includes 9 OFDM symbols. One frame may include subframes each having the same type. Alternatively, one frame may include subframes each having a different type. That is, the number of OFDM symbols included in each subframe may be identical or different in one frame. Alternatively, the number of OFDM symbols included in at least one subframe of one frame may be different from the number of OFDM symbols of the remaining subframes of the frame.

Time division duplexing (TDD) or frequency division duplexing (FDD) may be applied to the frame. In the TDD, each subframe is used in uplink or downlink transmission at the same frequency and at a different time. That is, subframes included in a TDD frame are divided into an uplink subframe and a downlink subframe in the time domain. In the FDD, each subframe is used in uplink or downlink transmission at the same time and at a different frequency. That is, subframes included in an FDD frame are divided into an uplink subframe and a downlink subframe in the frequency domain. Uplink transmission and downlink transmission occupy different frequency bands and can be simultaneously performed.

One OFDM symbol includes a plurality of subcarriers. The number of subcarriers is determined by a fast Fourier transform (FFT) size. The subcarrier can be classified into a data subcarrier for data transmission, a pilot subcarrier for various estimations, and a null subcarrier for a guard band and a direct current (DC) carrier. The OFDM symbol is characterized by parameters BW, $N_{used}$, n, G, etc. The parameter BW denotes a nominal channel bandwidth. The parameter $N_{used}$ denotes the number of used subcarriers (including the DC subcarrier). The parameter n denotes a sampling factor. The parameter n is combined with the parameters BW and $N_{used}$ to determine a subcarrier spacing and a useful symbol time. The parameter G denotes a ratio of a cyclic prefix (CP) time and a useful time.

Table 1 below shows an orthogonal frequency division multiple access (OFDMA) parameter.

TABLE 1

| | | 5 | 7 | 8.75 | 10 | 20 |
|---|---|---|---|---|---|---|
| Channel bandwidth, BW(MHz) | | 5 | 7 | 8.75 | 10 | 20 |
| Sampling factor, n | | 28/25 | 8/7 | 8/7 | 28/25 | 28/25 |
| Sampling frequency, Fs(MHz) | | 5.6 | 8 | 10 | 11.2 | 22.4 |
| FFT size, $N_{FFT}$ | | 512 | 1024 | 1024 | 1024 | 2048 |
| Subcarrier spacing, Δf(kHz) | | 10.94 | 7.81 | 9.77 | 10.94 | 10.94 |
| Useful symbol time Tb(μs) | | 91.4 | 128 | 102.4 | 91.4 | 91.4 |
| G = 1/8 | Symbol time, Ts(μs) | 102.857 | 144 | 115.2 | 102.857 | 102.857 |
| | FDD Number of OFDMA symbols per 5 ms frame | 48 | 34 | 43 | 48 | 48 |
| | Idle time(μs) | 62.857 | 104 | 46.40 | 62.857 | 62.857 |
| | TDD Number of OFDMA symbols per 5 ms frame | 47 | 33 | 42 | 47 | 47 |
| | TTG + RTG(μs) | 165.714 | 248 | 161.6 | 165.714 | 165.714 |
| G = 1/16 | Symbol time, Ts(μs) | 97.143 | 136 | 108.8 | 97.143 | 97.143 |
| | FDD Number of OFDMA symbols per 5 ms frame | 51 | 36 | 45 | 51 | 51 |
| | Idle time(μs) | 45.71 | 104 | 104 | 45.71 | 45.71 |
| | TDD Number of OFDMA symbols per 5 ms frame | 50 | 35 | 44 | 50 | 50 |
| | TTG + RTG(μs) | 142.853 | 240 | 212.8 | 142.853 | 142.853 |
| G = 1/4 | Symbol time, Ts(μs) | 114.286 | 160 | 128 | 114.286 | 114.286 |
| | FDD Number of OFDMA symbols per 5 ms frame | 43 | 31 | 39 | 43 | 43 |
| | Idle time(μs) | 85.694 | 40 | 8 | 85.694 | 85.694 |

TABLE 1-continued

| | | | | | | |
|---|---|---|---|---|---|---|
| TDD | Number of OFDMA symbols per 5 ms frame | 42 | 30 | 38 | 42 | 42 |
| | TTG + RTG(μs) | 199.98 | 200 | 136 | 199.98 | 199.98 |
| Number of Guard subcarriers | Left | 40 | 80 | 80 | 80 | 160 |
| | Right | 39 | 79 | 79 | 79 | 159 |
| Number of used subcarriers | | 433 | 865 | 865 | 865 | 1729 |
| Number of PRU in type-1 subframe | | 24 | 48 | 48 | 48 | 96 |

In Table 1, $N_{FFT}$ denotes a smallest power of 2 greater than $N_{used}$. A sampling factor is defined as $F_s$ = floor(n · BW/8000) × 8000. A subcarrier spacing is defined as $\Delta f = F_s/N_{FFT}$. A useful symbol time is defined as $Tb = 1/\Delta f$. A CP time is defined as $Tg = G \cdot Tb$. An OFDMA symbol time is defined as $Ts = Tb + Tg$. A sampling time is defined as $Tb/N_{FFT}$.

A subframe includes a plurality of physical resource units (PRUs) in the frequency domain. The PRU is a basic physical unit for resource allocation, and consists of a plurality of consecutive OFDM symbols in the time domain and a plurality of consecutive subcarriers in the frequency domain. The number of OFDM symbols included in the PRU may be equal to the number of OFDM symbols included in one subframe. Therefore, the number of OFDM symbols in the PRU can be determined according to a subframe type. For example, when one subframe consists of 6 OFDM symbols, the PRU may be defined with 18 subcarriers and 6 OFDM symbols.

A logical resource unit (LRU) is a basic logical unit for distributed resource allocation and contiguous resource allocation. The LRU is defined with a plurality of OFDM symbols and a plurality of subcarriers, and includes pilots used in the PRU. Therefore, a desired number of subcarriers for one LRU depends on the number of allocated pilots.

A distributed logical resource unit (DLRU) may be used to obtain a frequency diversity gain. The DLRU includes a distributed subcarrier group in one frequency partition. The DRU has the same size as the PRU. One subcarrier is a basic unit of constituting the DRU.

A contiguous logical resource unit (CLRU) may be used to obtain a frequency selective scheduling gain. The CLRU includes a localized subcarrier group. The CLRU has the same size as the PRU.

Figure 3:
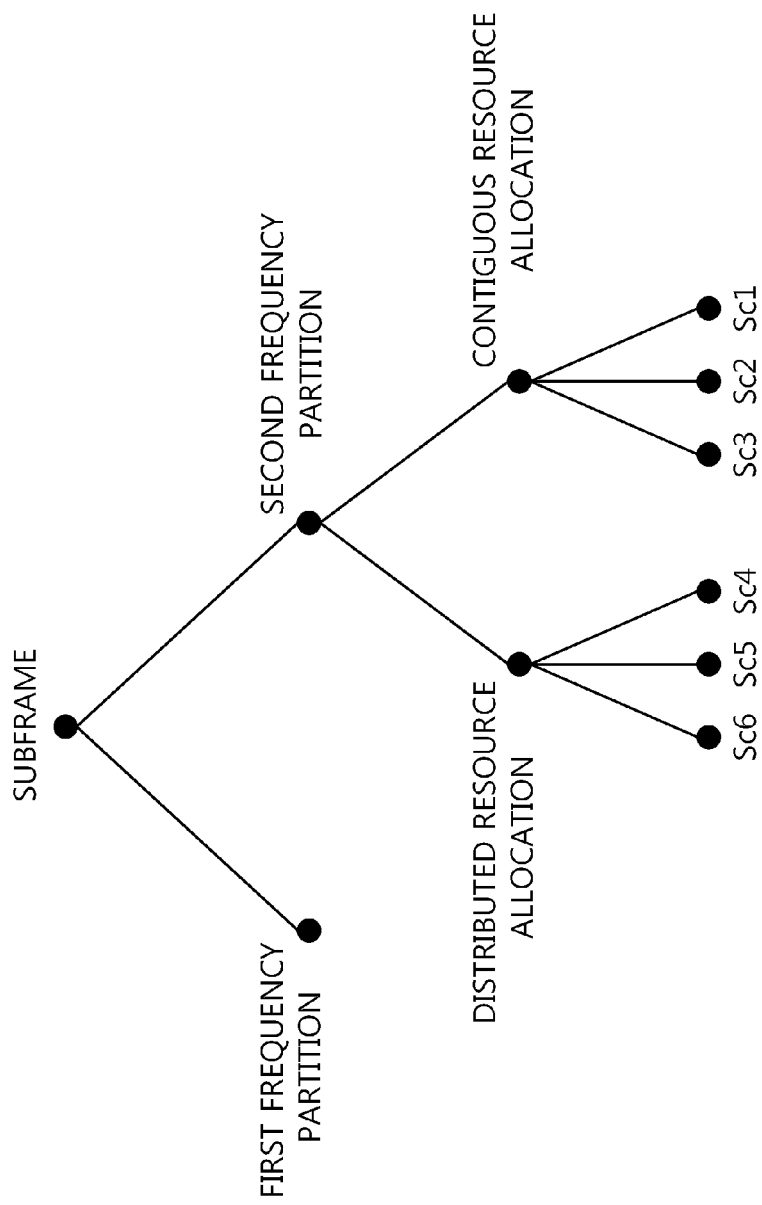
FIG. 3 shows an example of a uplink resource structure.

FIG. 3 shows an example of a uplink resource structure.

Referring to FIG. 3, a uplink subframe can be divided into at least one FP. Herein, the subframe is divided into two FPs (i.e., FP1 and FP2) for example. However, the number of FPs in the subframe is not limited thereto. The number of FPs can be 4 at most. Each FP can be used for other purposes such as FFR.

Each FP consists of at least one PRU. Each FP may include distributed resource allocation and/or contiguous resource allocation. Herein, the second FP (i.e., FP2) includes the distributed resource allocation and the contiguous resource allocation. 'Sc' denotes a subcarrier.

Hereinafter, a structure of a ranging channel will be described.

In an institute of electrical and electronics engineers (IEEE) 802.16e system, the structure of the ranging channel may differ according to usage of the ranging channel. The ranging channel can be used for the usage of initial access or handover, or can be used for the usage of periodic ranging or bandwidth request. A mobile station (MS) can transmit an initial access ranging channel to establish initial uplink time synchronization, and can transmit a handover ranging channel for handover to another cell. Alternatively, a periodic ranging channel can be transmitted to update time and frequency synchronization, and a bandwidth request ranging channel can be transmitted to request a frequency resource. A type of the ranging channel and allocation information of time or frequency resources allocated to the ranging channel can be broadcast by using UL-MAP.

Figure 4:
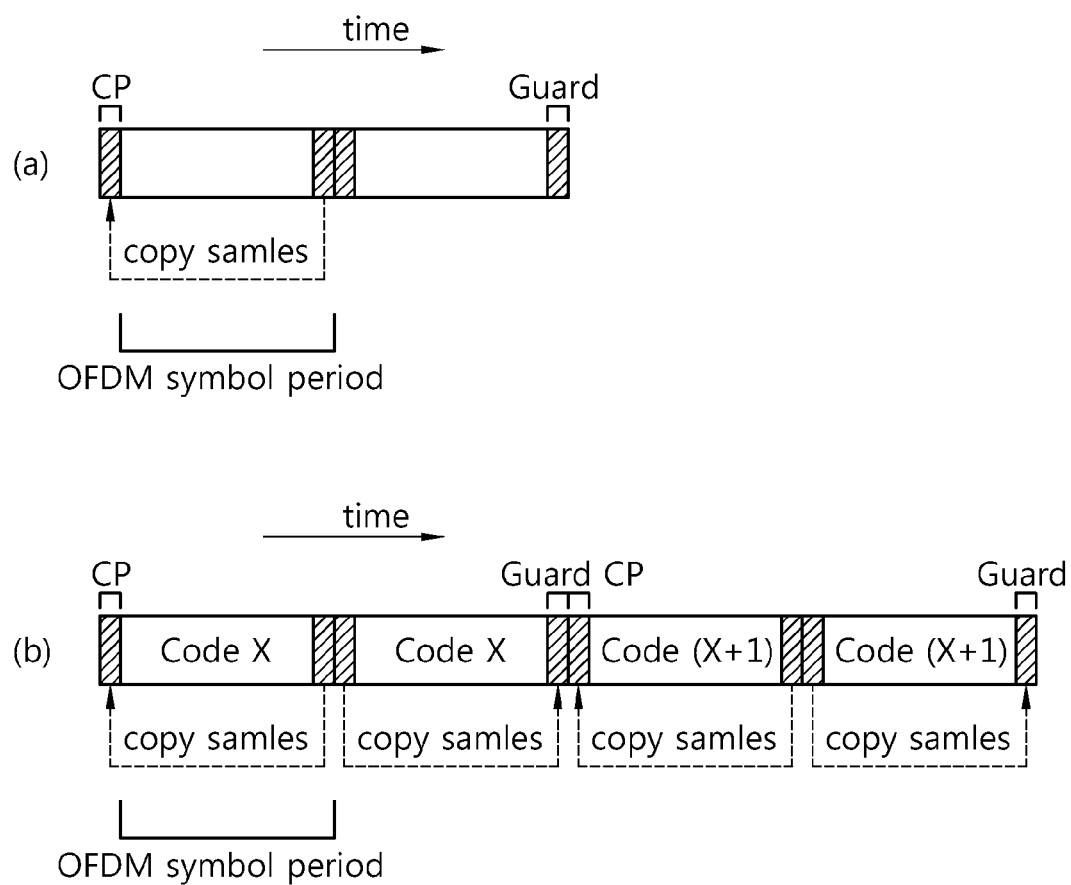
FIG. 4 shows an exemplary structure of an initial access ranging channel or a handover ranging channel of an IEEE 802.16e system.

FIG. 4 shows an exemplary structure of an initial access ranging channel or a handover ranging channel of an IEEE 802.16e system.

A ranging channel of FIG. 4-(a) includes two consecutive orthogonal frequency-division multiplexing (OFDM) symbols. In respective symbol durations, the same ranging code can be transmitted in the ranging channel without phase discontinuity between two symbols. A ranging channel of FIG. 4-(b) includes four consecutive OFDM symbols. A base station (BS) can allocate two consecutive ranging codes, and thus an MS transmits two consecutive ranging codes. That is, a ranging code used in a $3^{rd}$ OFDM symbol and a $4^{th}$ OFDM symbol may be a ranging code consecutive to a code used in a $1^{st}$ OFDM symbol and a $2^{nd}$ OFDM symbol. The BS can select one of the ranging channel structures of FIG. 4-(a) and FIG. 4-(b) and can broadcast the selected ranging channel structure to the MS. For example, a cell having a good channel state can use the ranging channel structure of FIG. 4-(a), and a cell having a bad channel state can use the ranging channel structure of FIG. 4-(b).

Figure 5:
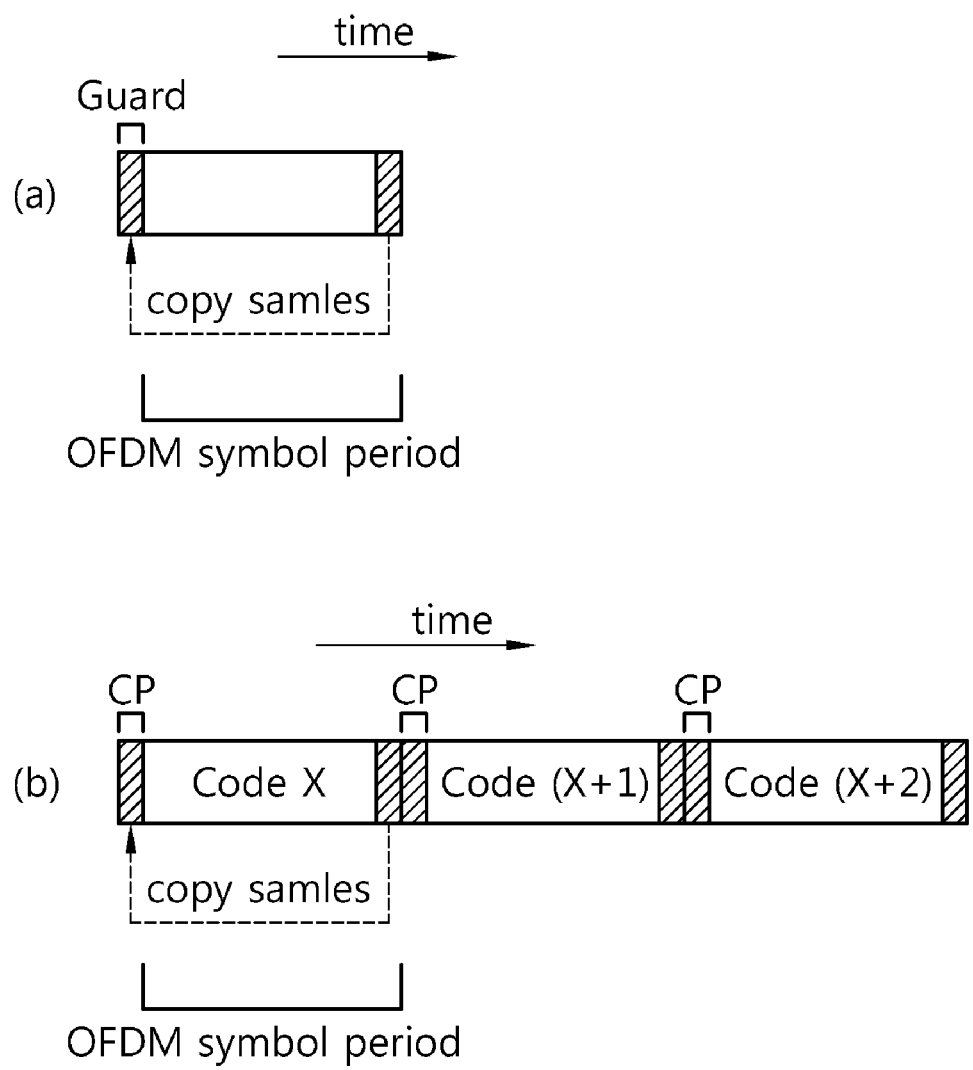
FIG. 5 shows an exemplary structure of a periodic ranging channel or a bandwidth request ranging channel of an IEEE 802.16e system.

FIG. 5 shows an exemplary structure of a periodic ranging channel or a bandwidth request ranging channel of an IEEE 802.16e system.

A ranging channel of FIG. 5-(a) includes one OFDM symbol. In one OFDM symbol duration, one ranging code can be modulated over a ranging sub-channel. The ranging sub-channel can be dynamically allocated by media access control (MAC), and can be indicated by UL-MAP. A ranging channel of FIG. 5-(b) includes three OFDM symbols. In three OFDM symbol durations, three consecutive ranging codes can be modulated over a ranging sub-channel. The ranging sub-channel can be dynamically allocated by MAC, and can be indicated by UL-MAP.

Figure 6:
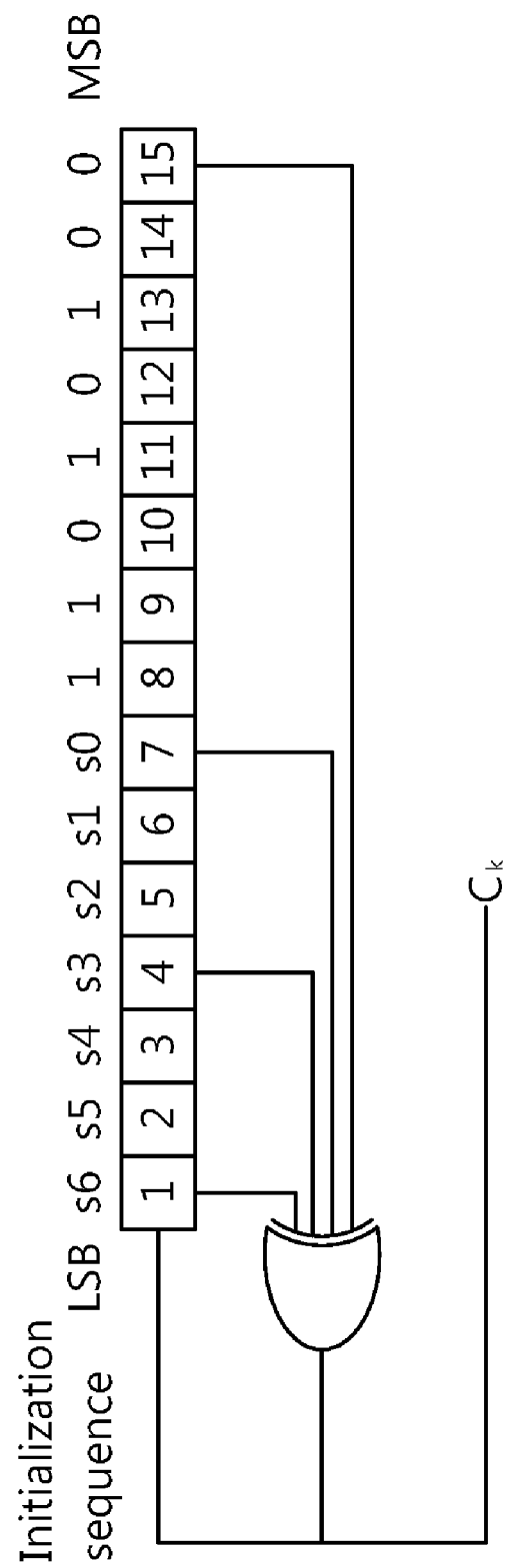
FIG. 6 is a logic diagram of a pseudo random binary sequence (PRBS) generator for generating a ranging code used in FIG. 4 and FIG. 5.

FIG. 6 is a logic diagram of a pseudo random binary sequence (PRBS) generator for generating a ranging code used in FIG. 4 and FIG. 5. Four types of ranging channel proposed in FIG. 4 and FIG. 5 may have different ranging codes. The PRBS generator of FIG. 6 generates a ranging code by using $1+x^1+x^4+x^7+x^{15}$ as a PN code generation equation. In this case, various values can be used as an initial value of a PRBS. For example, {b14, b13, ..., b1, b0}={0, 0, 1, 0, 0, 1, 0, 1, 1, s0, s1, s2, s3, s4, s5, s6} can be used as the initial value of the PRBS. Herein, {b6, ..., b0} may denote UL_PermBase, and s6 may denote a least significant bit (LSB) of the initial value of the PRBS and a most significant bit (MSB) of Ul_PermBase. By using the PN code generation equation, 256 ranging codes can be generated in total, and the generated ranging code is identified according to each usage. For example, first N codes are used for the usage of initial access ranging, following M codes are used for the usage of periodic ranging, following L codes are used for the usage of bandwidth request ranging, and last P codes are used for the usage of handover ranging. The number of ranging codes used for each usage may be broadcast.

In the IEEE 802.16m system, the ranging channel may include a ranging channel for a non-synchronized MS and a ranging channel for a synchronized MS. The ranging channel for the non-synchronized MS can be used for the usage of initial network entry of the MS and for the usage of ranging on a target BS during handover. The ranging channel for the synchronized MS can be used for periodic ranging. An MS synchronized previously with the target BS can transmit a ranging signal for the synchronized MS.

Figure 7:
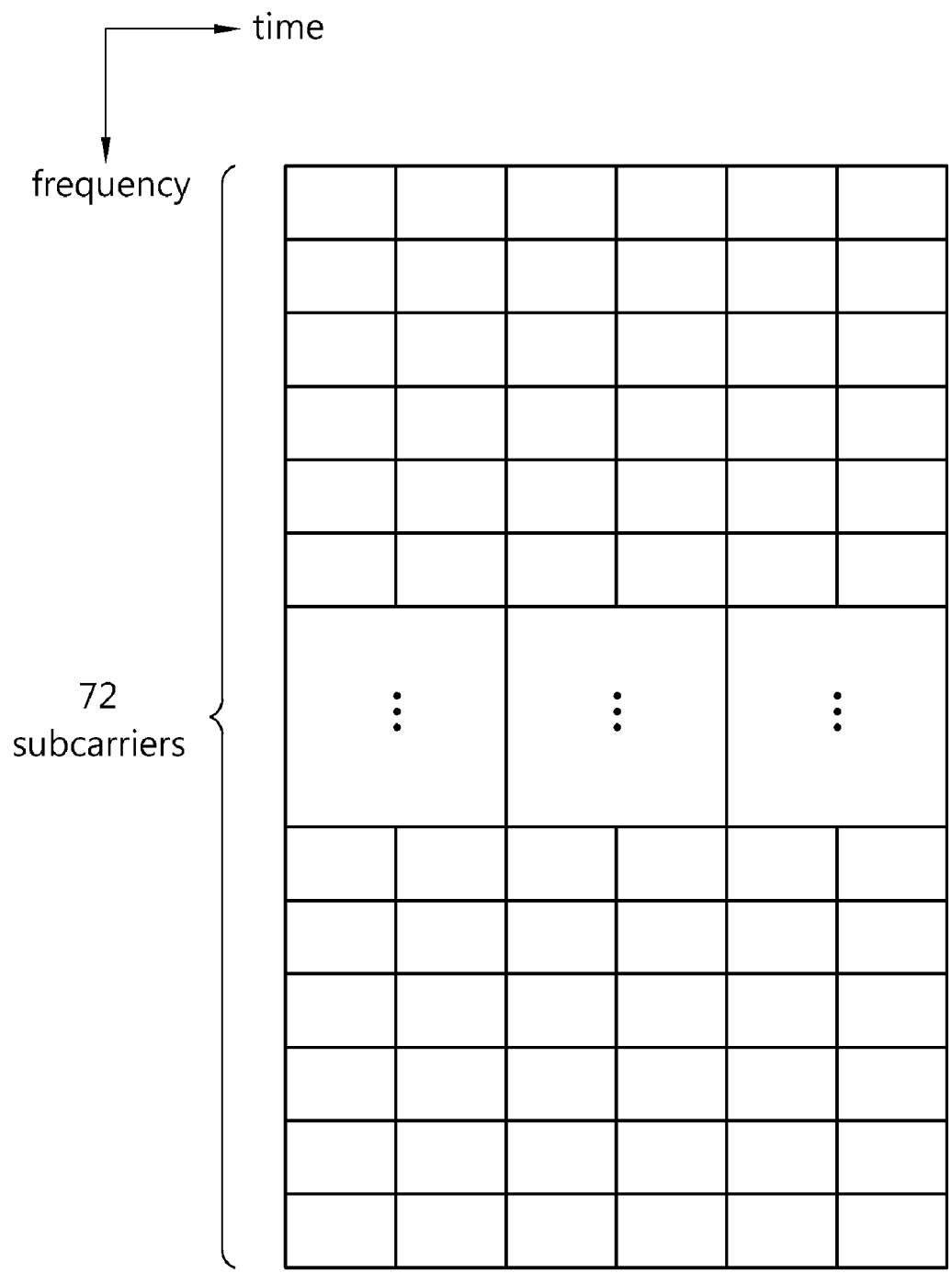
FIG. 7 shows an exemplary structure of a periodic ranging channel in an IEEE 802.16m system.

FIG. 7 shows an exemplary structure of a periodic ranging channel in an IEEE 802.16m system.

The ranging channel can be allocated to one sub-band including 72 consecutive subcarriers. In the periodic ranging channel of the IEEE 802.16m system, a basic structure can be constructed of one sub-band and one OFDM symbol. To cover a wider area, the basic structure may be repeated in a time domain. The basic structure may be repeated in the time domain 2 or 3 times. If the basic structure is repeated 2 times, the ranging channel has 3 transmission opportunities in one subframe. If the basic structure is repeated 3 times to cover a wider area, the ranging channel has 2 transmission opportunities in one subframe. When the basic structure is repeated 2 times in a macro cell, 3 transmission opportunities of the ranging channel are allocated in one subframe. If a size of the macro cell is not great, the basic structure may be not necessarily repeated in the time domain, and the remaining subcarriers can be used as a data resource block similarly to a femto cell. In addition, one subframe can be allocated to the ranging channel in every M subframes at a bandwidth of 10 MHz.

Figure 8:
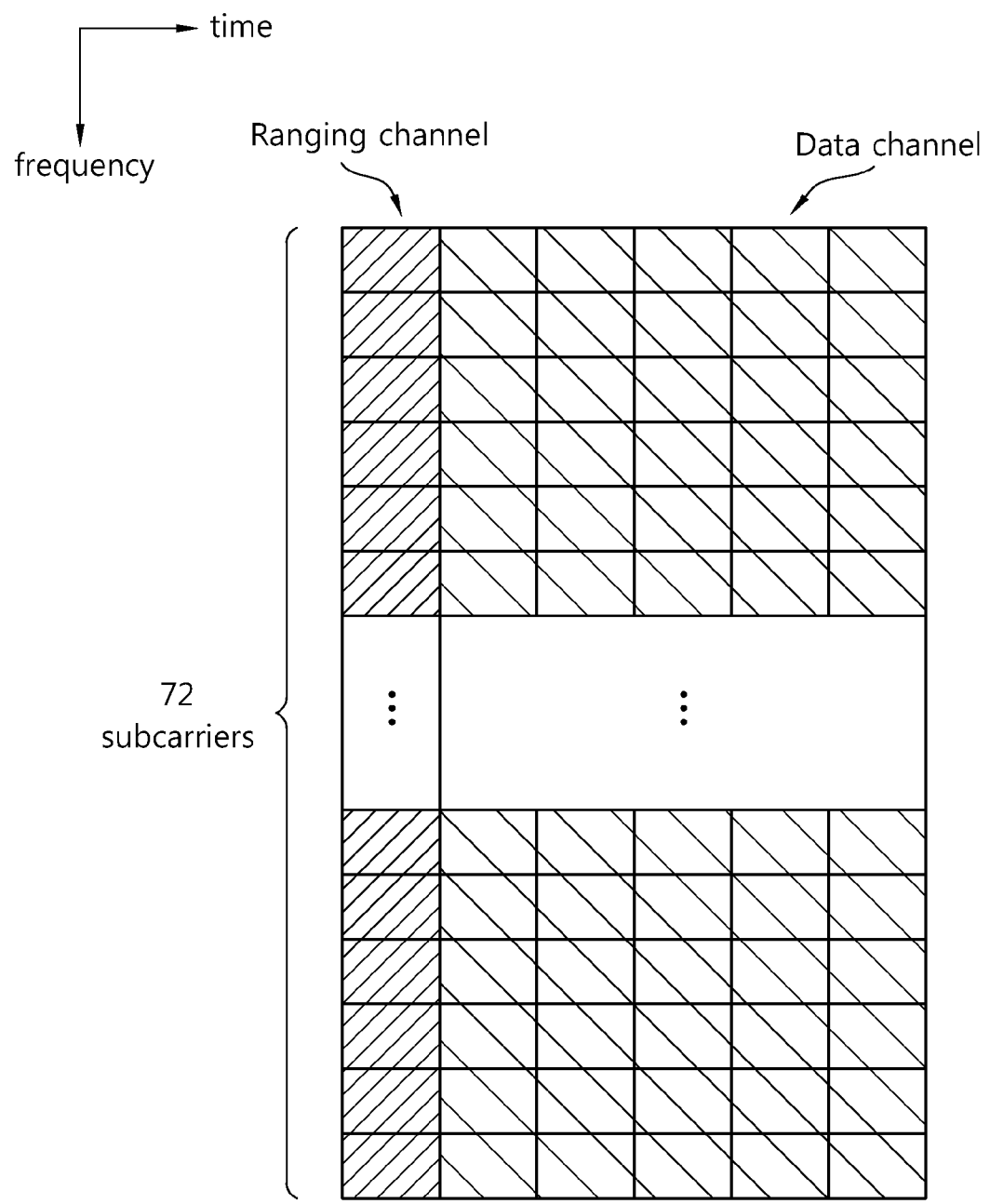
FIG. 8 shows another exemplary structure of a periodic ranging channel in an IEEE 802.16m system.

FIG. 8 shows another exemplary structure of a periodic ranging channel in an IEEE 802.16m system. The ranging channel of FIG. 8 can be used in a femto cell. The ranging channel in the femto cell may be TDM-multiplexed with a data channel. The ranging channel may occupy one sub-band including 72 consecutive subcarriers and one OFDM symbol in one subframe, and the remaining subcarriers may constitute a CRU corresponding to 5 OFDM symbols. As such, when the ranging channel and the data channel are TDM-multiplexed in the femto cell, time synchronization can be established correctly and high spectral efficiency can be achieved. However, there is a disadvantage in that two types of PRU exist in one subframe.

Figure 9:
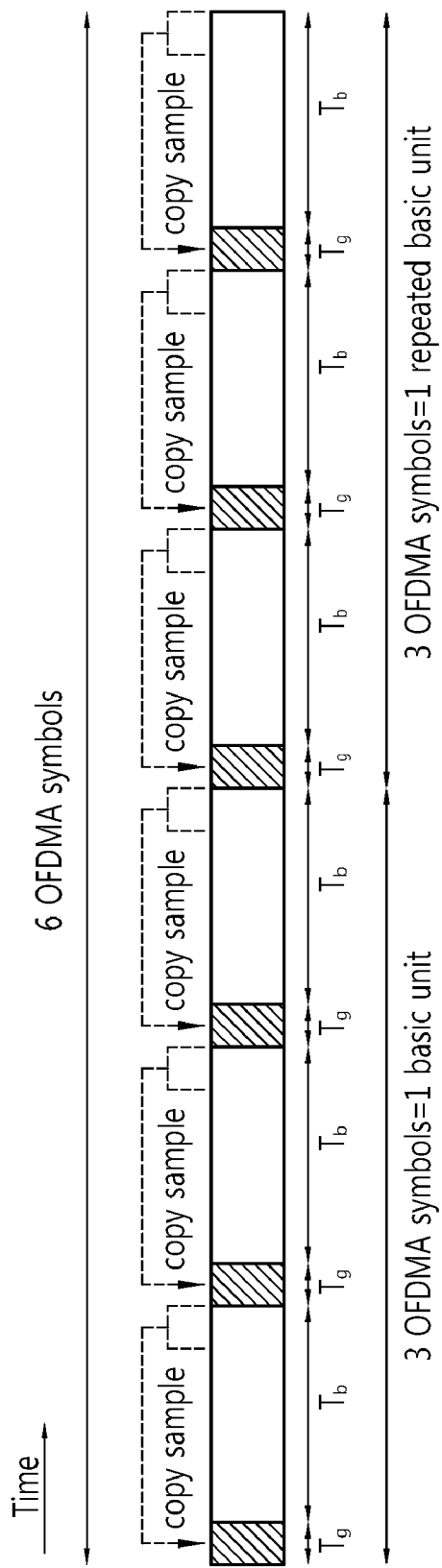
FIG. 9 shows an exemplary structure of a ranging channel for a synchronized MS.

FIG. 9 shows an exemplary structure of a ranging channel for a synchronized MS.

The ranging channel for the synchronized MS may occupy 72 subcarriers and 6 OFDM symbols starting from a first OFDM symbol of one subframe. The ranging channel for the synchronized MS may occupy 72 subcarriers and 3 OFDM symbols, and may consist of a basic unit generated from a ranging preamble code and a repeated unit which is one time repetition of the basic unit. Tb denotes a useful symbol time of Table 1. Tg denotes a CP time. First three OFDM symbols are allocated to the basic unit, and next three OFDM symbols are allocated to the repeated unit.

A sequence of Equation 1 can be used as a ranging preamble code used in the ranging channel.

$$s_{k+1,m} = c_u(k+m) = \exp^{\frac{-ju\pi(k+m)(k+m+1)}{N_{ZC}}}, \quad [\text{Equation 1}]$$
$$k = 0, \ldots, N_{ZC}$$

In Equation 1, ZC may be 71. m denotes a cyclic shift value in each cell, and may be any one value selected from the set of $\{0, 10, 20, 30, 40, 50, 60\}$. Since 7 sequences are allocated for $u=1, \ldots, 70$ in each cell, 490 sequences can be used in total. A cyclic shift is applied based on m in a frequency domain, and a plurality of ranging preamble codes are generated. All root indices are used in one cell, and different cyclic shift values are used in adjacent cells.

A ZC sequence having a root index r and a length $N_{ZC}$ can be defined by Equation 2. The ZC sequence can be used as the ranging preamble code of the ranging channel.

$$x_r(k) = \begin{cases} \exp\left(\frac{-j2\pi r}{N_{ZC}}\left(\frac{k^2}{2}+qk\right)\right), & k=0,1,\ldots,N_{ZC}-1 \text{ if } N_{ZC} \text{ is even.} \\ \exp\left(\frac{-j2\pi r}{N_{ZC}}\left(\frac{k(k+1)}{2}+qk\right)\right), & k=0,1,\ldots,N_{ZC}-1 \text{ if } N_{ZC} \text{ is odd.} \end{cases} \quad [\text{Equation 2}]$$

In Equation 1, q may be any natural number. If q=0, an odd-length ZC sequence can be expressed by Equation 3.

$$x_r(k) = \exp\left(-j\frac{\pi rk(k+1)}{N_{zc}}\right), k = 0, 1, \ldots, N_{zc}-1 \quad [\text{Equation 3}]$$

In Equation 2 or Equation 3, if $N_{ZC}$ is a prime number, all natural numbers from 0 to $N_{ZC}-1$ can be used without deteriorating sequence properties (e.g., auto-correlation, cross-correlation, etc.).

A cyclic shift can be applied in a domain where the ZC sequence is defined. That is, when the ZC sequence is defined in a time domain, the ZC sequence can be cyclic shifted in the time domain, and when the ZC sequence is defined in a frequency domain, the ZC sequence can be cyclic shifted in the frequency domain. Irrespective of in which domain the ZC sequence is defined, if q=0, the ZC sequence to which cyclic shift is applied can be expressed by Equation 4 and Equation 5.

$$x_r(n) = \exp\left(-j\frac{\pi rn(n+1)}{N_{ZC}}\right), 0 \le n \le N_{ZC}-1 \quad [\text{Equation 4}]$$

$$x_{r,v}(n) = x_r((n+C_v) \bmod N_{ZC}) \quad [\text{Equation 5}]$$

In Equation 5, $x_{r,v}(n)$ denotes a $v^{th}$ cyclic shifted sequence having a root index r, and $C_v$ denotes a $v^{th}$ cyclic shifted value.

A generalized chirp-like (GCL) sequence having a root index r and a length $N_{ZC}$ can be defined by Equation 6. The GCL sequence can also be used as the ranging preamble code of the ranging channel.

$$x_r(k) = \exp\left(-j2\pi r \frac{k(k+q)}{N_{GCL}}\right),$$ [Equation 6]

$$k = 0, 1, \ldots, N_{GCL} - 1$$

In Equation 6, q may be any natural number.

An extended ZC sequence (or a padded ZC sequence) having a length $N_{ZC}+n$ obtained from a ZC sequence having a root index r and a length $N_{ZC}$ can be defined by Equation 7. The extended ZC sequence can also be used as the ranging preamble code of the ranging channel.

[Equation 7]

$$x_r(k) = \begin{cases} \exp\left(\frac{-j2\pi r}{N_{ZC}}\left(\frac{k^2}{2} + qk\right)\right), & k = 0, 1, \ldots, N_{ZC} + n - 1 \text{ if } N_{ZC} \text{ is even.} \\ \exp\left(\frac{-j2\pi r}{N_{ZC}}\left(\frac{k(k+1)}{2} + qk\right)\right), & k = 0, 1, \ldots, N_{ZC} + n - 1 \text{ if } N_{ZC} \text{ is odd.} \end{cases}$$

In Equation 7, q may be any natural number. If q=0, an odd-length ZC sequence can be expressed by Equation 8.

$$x_r(k) = \exp\left(-j\frac{\pi rk(k+1)}{N_{zc}}\right),$$ [Equation 8]

$$k = 0, 1, \ldots, N_{zc} + n - 1$$

In Equation 7 or Equation 8, if $N_{ZC}$ is a prime number, all natural numbers from 0 to $N_{ZC}-1$ can be used without deteriorating sequence properties (e.g., auto-correlation, cross-correlation, etc.).

Hereinafter, the proposed ranging preamble code generation method will be described according to an embodiment of the present invention.

The proposed ranging preamble code generation method can be applied to increase the number of codes to be used as a ranging preamble code transmitted through a ranging channel while decreasing a signaling overhead. In the embodiment described below, the ranging channel has a specific structure and a ZC sequence or an extended ZC sequence is used as the ranging preamble code for example, but the present invention is not limited thereto. The ranging channel can have various structures, and it is assumed in the present invention that the ZC sequence is used as the ranging preamble code for convenience of explanation. However, the present invention is not limited thereto, and thus a GCL sequence, a modified ZC sequence, a modified GCL sequence, or the like can also be used. A cyclic extended sequence, a zero-padded sequence, or the like can be used as the modified ZC sequence or the modified GCL sequence.

As a ranging preamble code used in a periodic ranging channel, a ZC sequence having a $u^{th}$ root index can be defined in the frequency domain by Equation 9.

$$x_u(n) = e^{-j\frac{\pi u n(n+1)}{N_{ZC}}}, \quad 0 \le n \le N_{ZC} - 1$$ [Equation 9]

In Equation 9, $N_{ZC}$ is a prime number and denotes a length of the ZC sequence. When the $N_{ZC}$ is the prime number, ZC sequences having different root indices have a low cross-correlation property. For example, if $N_{ZC}=71$, ZC sequences having different root indices from 1 to 70 (i.e., $N_{ZC}-1$) have a low cross-correlation property of $1/\sqrt{71}$. Likewise, if $N_{ZC}=139$, the ZC sequences having different root indices from 1 to 138 (i.e., $N_{ZC}-1$) have a low cross-correlation property of $1/\sqrt{139}$. That is, the number of codes that maintain a low cross-correlation property of the ZC sequence is $N_{ZC}-1$.

Meanwhile, the ZC sequence also has an excellent self-correlation property. In particular, when the ZC sequence is cyclic shifted in the time domain, each code having a different cyclic shift value is characterized in that a correlation is 0. That is, a greater number of codes can be used than a case of using each code to which a different cyclic shift value is applied in the time domain while avoiding performance deterioration. When considering a root index of the ZC sequence, a cross-correlation property can be reduced among all codes by using a ZC sequence having the same root index and a different cyclic shift value rather than using a ZC sequence having a different root index. Accordingly, detection capability of the ZC sequence can be increased. That is, when generating the ranging preamble code of the ranging channel, a cyclic shift value needs to be considered in addition to the root index in order to use a greater number of codes.

Figure 10:
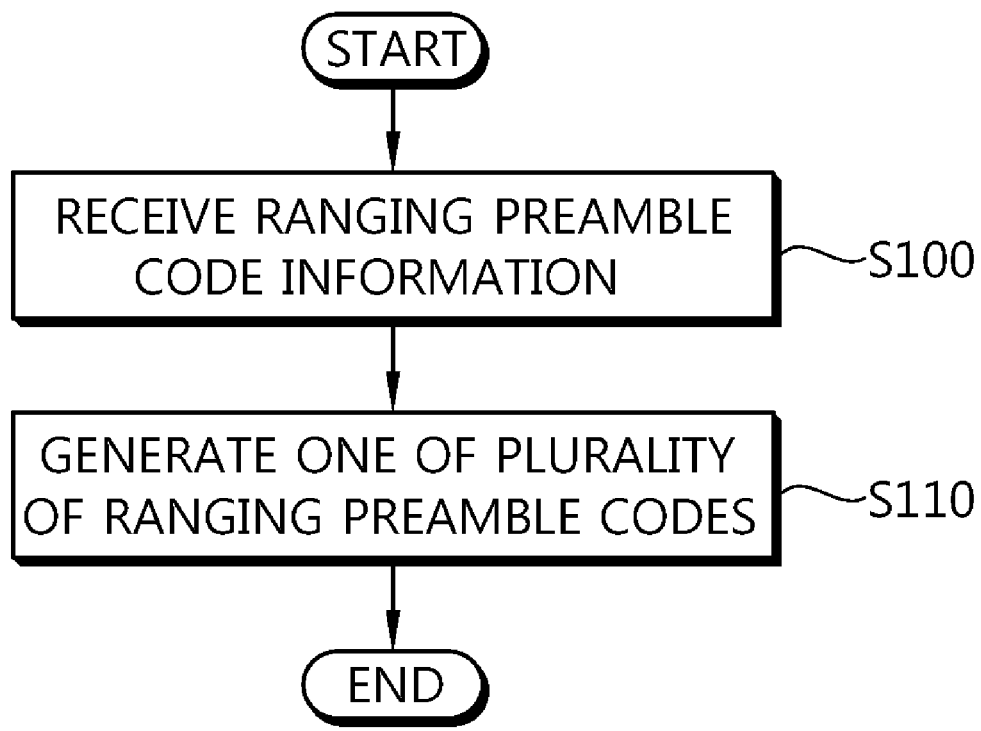
FIG. 10 is a flowchart of the proposed ranging preamble code generation method according to an embodiment of the present invention.

FIG. 10 is a flowchart of the proposed ranging preamble code generation method according to an embodiment of the present invention.

In step S100, an MS receives ranging channel information from a BS. The ranging preamble code information can be broadcast through an S-SFH or the like. The ranging preamble code information may include information on a frequency domain and a time domain allocated to a ranging channel. The ranging preamble code information may include various types of parameters for generating a ranging preamble code constituting the ranging channel, and in particular, may include a parameter regarding a start root index $r_0$ among available root indices in a cell and information indicating the number of periodic ranging preamble codes.

In step S110, the MS generates one of a plurality of ranging preamble codes. The MS randomly selects any one of the time domain and the frequency domain, determines a plurality of ranging preamble codes while incrementing a root index in the selected domain, and generates one ranging preamble code randomly selected from the plurality of ranging preamble codes.

As the ranging preamble code, the MS can use a ZC sequence to which a cyclic shift value is applied.

For example, a ZC sequence cyclic shifted as shown in Equation 10 can be used as the ranging preamble code.

$$\begin{aligned} x_p(k) &= \exp\left(-j\frac{\pi rk(k+1)}{N_{RP}}\right)\exp\left(-j\frac{2\pi \cdot k \cdot s \cdot N_{CS}}{N_{RP}}\right) \\ &= \exp\left(-j\frac{\pi rk(k+1) + 2\pi \cdot k \cdot s \cdot N_{CS}}{N_{RP}}\right) \\ &= \exp\left(-j \cdot \pi \frac{rk(k+1) + 2 \cdot k \cdot s \cdot N_{CS}}{N_{RP}}\right), \end{aligned}$$ [Equation 10]

$$k = 0, 1, \ldots, N_{RP} - 1$$

In Equation 10, p denotes an index of a ranging preamble code determined at an $s^{th}$ cyclic shift from a ZC sequence having a root index r. $N_{CS}$ is a unit of cyclic shift, and based on this unit, a ranging preamble code used in the ranging code is cyclic shifted in the time domain. $N_{RP}$ denotes a length of the ranging preamble code.

A ZC sequence cyclic shifted by Equation 11 can be used as the ranging preamble code. This ZC sequence is cyclic shifted based on an FFT size $N_{FFT}$ depending on a bandwidth.

$$x_p(k) = \exp\left(-j\frac{\pi rk(k+1)}{N_{RP}}\right)\exp\left(-j\frac{2\pi \cdot k \cdot s \cdot N_{CS}}{N_{FFT}}\right), \quad [\text{Equation 11}]$$
$$k = 0, 1, \ldots, N_{RP}-1$$

In Equation 11, p denotes an index of a ranging preamble code determined at an $s^{th}$ cyclic shift from a ZC sequence having a root index r. $N_{CS}$ is a unit of cyclic shift, and based on this unit, a ranging preamble code used in the ranging code is cyclic shifted in the time domain. $N_{RP}$ denotes a length of the ranging preamble code.

In addition, a ZC sequence cyclic shifted by Equation 12 can be used as the ranging preamble code.

$$x_p(k) = \exp\left(-j\frac{\pi rk(k+1)}{N_{RP}}\right)\exp\left(-j\frac{2\pi \cdot k \cdot s \cdot N_{CS}}{N}\right), \quad [\text{Equation 12}]$$
$$k = 0, 1, \ldots, N_{RP}-1$$

In Equation 12, p denotes an index of a ranging preamble code determined at an $s^{th}$ cyclic shift from a ZC sequence having a root index r. $N_{CS}$ is a unit of cyclic shift, and based on this unit, a ranging preamble code used in the ranging code is cyclic shifted in the time domain. $N_{RP}$ denotes a length of the ranging preamble code. N denotes the number of samples in the time domain in accordance with the sequence. That is, a cyclic shift in the time domain can be applied by using only the number of samples in the time domain rather than the length of the ranging preamble code or the FFT size.

Meanwhile, a resource allocation unit is generally an even number in the frequency domain, and thus, zero may be appended before or after the ZC sequence to fit to the length of the even number. Alternatively, a cyclic prefix or a cyclic postfix may be appended before or after the ZC sequence to make the ZC sequence length the even number. Equation 13 shows an extended ZC sequence determined by appending the cyclic postfix after the ZC sequence.

$$x_u(n) = e^{-j\frac{\pi u n(n+1)}{N_{ZC}}}, \quad 0 \leq n \leq N_{ZC} \quad [\text{Equation 13}]$$

When the cyclic shift is applied to the ranging preamble code as described above, the cyclic shift unit can be fixed to a specific fixed value determined as a function of a CP length.

In general, a cyclic shift unit in an initial access ranging channel or a handover ranging channel can be determined as a function of a maximum delay spread or a maximum round-trip delay time based on a maximum supportable cell radius. On the other hand, since the periodic ranging channel is a channel transmitted in a state where a BS and an MS are synchronized, a cyclic shift unit as large as that used in the initial access ranging channel or the handover ranging channel is not necessary. Therefore, a pre-defined value can be used without signaling of the cyclic shift unit in the periodic ranging channel. The pre-defined value can be determined as a function of the CP length used in a data channel. For example, when a CP length Tg at a 5 MHz bandwidth is any one of Tg=¼*Tb, Tg=⅛*Tb, and Tg=1/16*Tb, the number Ng of samples of CP depending on the bandwidth may be 128 (=512/4), 64(=512/8), and 32(=512/16), respectively. The fractional number ¼, ⅛, or 1/16 is denoted by G which is a ratio of a CP length to an effective symbol duration of Table 1. Tb denotes the effective symbol duration. Further, 512 is denoted by Nb as an FFT size at the 5 MHz bandwidth, and Nb may be 1024 and 2048 at 10 MHz and 20 MHz bandwidths, respectively. A cyclic shift value in the time domain can be expressed as a function of Ng. In each frame structure, a CP length is determined by considering a maximum delay spread, and thus an influence of delay spread can be avoided by using a cyclic shift unit having the same length with the CP length.

Alternatively, a length of the cyclic shift unit may be greater than or equal to the CP length in preparation for the case where an out-of-synchronization occurs to an extent greater than the maximum delay spread. That is, instead of Tg or Ng, 1.5*Tg (or 1.5*Ng) or 2*Tg(2*Ng) can be used as the cyclic shift unit, so that synchronization can be performed even if an out-of-synchronization occurs to an extent greater than the maximum delay spread. In this case, the length of the cyclic shift unit can be expressed as a function of $N_{FFT}$, or the length of the cyclic shift unit can be expressed as a function of $N_{ZC}$ which is the length of the ZC sequence. For example, the cyclic shift unit can be denoted by $1.5*Tg(N_{FFT}/N_{ZC})$ (or $1.5*Ng*(N_{FFT}/N_{ZC})$) or $2*Tg*(N_{FFT}/N_{ZC})$ (or $2*Ng*(N_{FFT}/N_{ZC})$) according to the length of the ZC sequence. In this case, as to the value $N_{FFT}/N_{ZC}$, a floor function can be used to return a smallest value, and a cell function can be used to return a greatest value.

Figure 11:
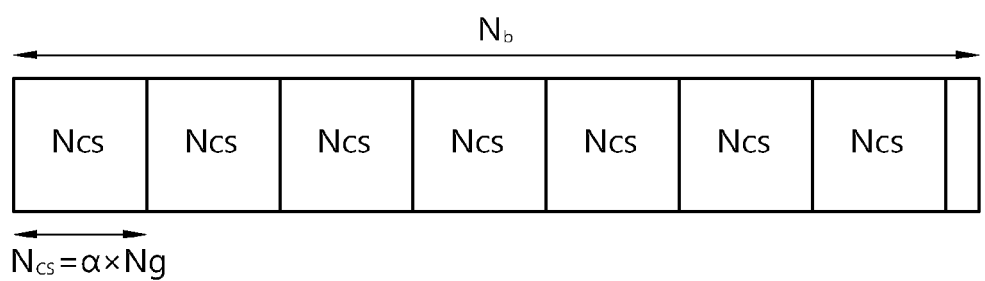
FIG. 11 shows an example of applying a cyclic shift according to the proposed ranging preamble generation method.

FIG. 11 shows an example of applying a cyclic shift according to the proposed ranging preamble generation method.

When an effective symbol duration is Tb and an FFT size is Nb, a cyclic shift unit $N_{CS}$ can be denoted as a function of Ng which is the number of samples of CP depending on a bandwidth. That is, $N_{CS}$ can be denoted by α*Ng. In case of a periodic ranging channel, the cyclic shift unit can be set to a fixed value Ng by setting α=1. In this case, Nb may not be a multiple of $N_{CS}$ due to a round-off error.

In addition, when applying the cyclic shift to the ranging preamble code, the cyclic shift unit can be set to a pre-defined value. This is to flexibly apply the cyclic shift unit according to various channel conditions or a requirement or the like when performing synchronization. A BS can broadcast information on the channel condition or the requirement to an MS. Table 2 and Table 3 show an example of the pre-defined cyclic shift unit. In Table 2, $N_{CS}$=0 implies that the cyclic shift is not applied.

TABLE 2

| Index | 0 | 1 | 2 | 3 |
|---|---|---|---|---|
| $N_{CS}$ | 0 | 0.5 * Tg | Tg | 1.5 * Tg |

TABLE 3

| Index | 0 | 1 | 2 | 3 |
|---|---|---|---|---|
| $N_{CS}$ | 0.5 * Tg | Tg | 1.5 * Tg | 2 * Tg |

Meanwhile, an IEEE 802.16m system can use a technique for a femto base station (BS), and researches related to this technique are actively ongoing in recent years. The femto BS represents a very small-sized mobile communication BS used in an indoor environment such as homes, offices, etc. The femto BS has a similar concept with a pico-cell. Yet, the femto BS has a concept of having a more advanced function than the pico-cell. The femto BS generally has lower transmission power, and provides an access to either a subscriber or a subscriber group consisting of access providers. The femto BS is connected to an Internet protocol (IP) network deployed in homes or offices, and provides a mobile communication service by accessing to a core network of a mobile communication system. That is, the femto BS is connected to the core network of the mobile communication system through a broadband connection such as a digital subscriber line (DSL). Further, the femto BS can communicate with a macro BS overlaid with the femto BS by exchanging a control message through an air-interface. A user of the mobile communication system can receive a service via a conventional macro BS in an outdoor environment, and can receive a service via the femto BS in an indoor environment.

Since a femto cell has a smaller coverage than a macro cell, a round-trip delay or delay spread of a signal may be shorter than a round-trip delay or delay spread of the macro cell. Therefore, to increase the number of ranging preamble codes usable in the femto cell, different cyclic shift units may be applied to the macro cell and the femto cell.

Figure 12:
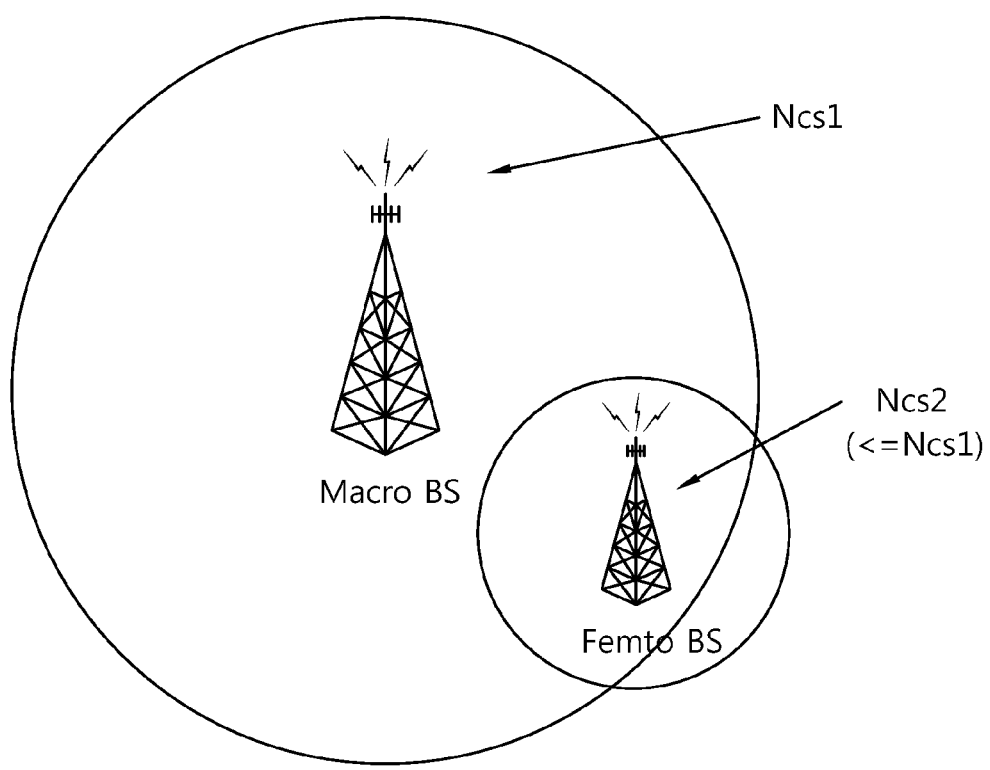
FIG. 12 shows an example of applying different cyclic shift units in a macro cell and a femto cell.

FIG. 12 shows an example of applying different cyclic shift units in a macro cell and a femto cell.

Referring to FIG. 12, a macro cell (or a macro BS) and a femto cell (or a femto BS) co-exist. The coverage of the macro cell may overlap with the coverage of the femto cell. The macro cell uses $N_{CS1}$ as a cyclic shift unit, and the femto cell uses $N_{CS2}$ as the cyclic shift unit. $N_{CS2}$ may be less than or equal to $N_{CS1}$. By allowing the cyclic shift unit of the femto cell to be smaller than the cyclic shift unit of the macro cell, the number of available ranging preamble codes can be increased. In this case, the number of bits of information transmitted in the macro cell and the femto cell may be set to the same number, or the number of bits of information transmitted in the femto cell may be set differently to decrease a signaling overhead in the femto cell.

Table 4 and Table 5 show an example of the cyclic shift unit in the macro cell and the femto cell.

TABLE 4

| | | Index | | | |
|---|---|---|---|---|---|
| | | 0 | 1 | 2 | 3 |
| $N_{CS}$ | Macro cell | 0 | | | |
| | Femto cell | 0 | 0.5 * Tg | Tg | 1.5 * Tg |

TABLE 5

| | | Index | | | |
|---|---|---|---|---|---|
| | | 0 | 1 | 2 | 3 |
| $N_{CS}$ | Macro cell | | | | |
| | Femto cell | 0.5 * Tg | Tg | 1.5 * Tg | 2 * Tg |

Alternatively, in case of the periodic ranging channel, the same ranging structure as the initial access ranging channel or the handover ranging channel can be used. In this case, the femto cell may use a cyclic shift unit different from a cyclic shift unit used in the initial access ranging channel or the handover ranging channel.

The femto cell described above is an example of a cell having a small coverage. In addition to the femto cell, the present invention can also be applied to another cell having a small coverage such as a pico cell, a relay cell, a hot spot, etc.

Although it has been described above that cyclic shift is applied by making the cyclic shift unit $N_{CS}$ an integer multiple of Tg or Ng for example, instead of simply making $N_{CS}$ the multiple of Tg or Ng, $N_{CS}$ may be set to a multiple of Tg or Ng by considering a length of a ranging preamble code and an OFMDA modulation ratio. For example, $N_{CS}=\lceil 2 \cdot G \cdot N_{ZC}\rceil$. $N_{ZC}$ denotes a length of a ranging preamble code. G is a CP ratio which is a ratio of a CP length Tg to an effective symbol duration Tb. G is any one of ¼, ⅛, and 1/16, and can be determined by Table 1. $N_{CS}$ has a fixed value according to the CP length. However, $N_{CS}$ changes when a CP length differs in a different frame structure. Alternatively, $N_{CS}=\lceil 2 \cdot G \cdot N_{RP}\rceil$, where $N_{RP}$ is a length of an extended (or a padded) ZC sequence.

Another example of the ranging preamble code according to the proposed ranging preamble code generation method can be defined by Equation 14. The ranging preamble code of Equation 14 is based on a ZC sequence cyclic shifted in the time domain and defined in the frequency domain.

$$x_p(k) = \exp\left(-j \cdot \pi \frac{r_p \cdot k(k+1) + 2 \cdot k \cdot s_p \cdot N_{CS}}{N_{RP}}\right), \quad \text{[Equation 14]}$$

$$k = 0, 1, \ldots, N_{RP} - 1$$

In Equation 14, p denotes an index of a ranging preamble code determined at an $s^p$ cyclic shift by $N_{CS}$ from a ZC sequence having a root index $r_p$. $r_p$ and $s_p$ can be defined by Equation 15.

$$\left. \begin{array}{l} r_p = \mathrm{mod}((1 - 2 \cdot \mathrm{mod}(\lfloor p/M \rfloor, 2)) \cdot (\lfloor p/M/2 \rfloor + r_0), N_{RP}) \\ s_p = \mathrm{mod}(p, M) \end{array} \right\}, \quad \text{[Equation 15]}$$

$$p = 0, 1, \ldots, N_{TOTAL} - 1$$

A ranging preamble code having an index p is determined by using a root index $r_p$ determined from a start root index $r_0$ and an $s_p^{th}$ cyclic shift. $r_0$ can be broadcast by the BS. Alternatively, it can be determined as $r_0=2*k_s+1(=1, 3, 5, \ldots, 33)$, where $k_s$ is a cell-specific value broadcast through an S-SFH. M denotes the number of cyclic shifted codes per root index of the ZC sequence, and it is determined as $M=\lfloor N_{RP}/N_{CS} \rfloor$. $N_{RP}$ is a length of the ranging preamble code, and may be a value obtained by adding 1 to $N_{ZC}$ which is a length of the ZC sequence. For example, if $N_{ZC}=71$, $N_{RP}=72$.

$N_{CS}$ is a cyclic shift unit, and can be determined as $N_{CS}=\lceil \alpha \cdot G \cdot N_{RP} \rceil$. Alternatively, it can be determined as $N_{CS}=\lceil \alpha \cdot G \cdot N_{RP} \rceil \cdot (N_{RP}+1)/(N_{RP})$. More simply, it can be expressed as $N_{CS}=\lceil \alpha \cdot G \rceil \cdot (N_{RP}+1)$. G denotes a CP ratio, and α can be determined to any integer. For example, it can be determined as α=1 or α=2 or α=1.5.

Alternatively, when a macro cell and a femto cell co-exist, reception complexity of the femto cell can be reduced by using a smaller cyclic shift unit and a small root index. That is, the cyclic shift unit of the femto cell can be set to a value smaller than the cyclic shift unit of the macro cell. The cyclic shift unit of the femto cell may be equal to the CP length (i.e., α=1) or be a half of the CP length (α=0.5). For example, α=2 in the macro cell, and α=1 in the femto cell. Alternatively, for system simplification, the cyclic shift unit of the macro cell can be directly used without having to separately determine the cyclic shift unit of the femto cell.

$N_{TOTAL}$ denotes the total number of periodic ranging preamble codes per sector. In case of the femto cell, $N_{TOTAL}$ can be denoted by a sum of $N_{IN}$ which is the number of initial access ranging preamble codes, $N_{HO}$ which is the number of handover ranging preamble codes, and $N_{PE}$ which is the number of periodic ranging preamble codes.

The number of periodic ranging preamble codes can be indicated by ranging preamble code information broadcast through the S-SFH. Table 6 shows an example of the number of periodic ranging preamble codes.

TABLE 6

| index | 0 | 1 | 2 | 3 |
|---|---|---|---|---|
| $N_{PE}$ | 8 | 16 | 24 | 32 |

Another example of the ranging preamble code according to the proposed ranging preamble code generation method can be defined by Equation 16. The ranging preamble code of Equation 16 is based on a padded ZC sequence.

$$x_p(n,k) = \exp\left(-j\cdot \pi\left(\frac{r_p(71\cdot n + k)(71\cdot n + k + 1)}{211} + \frac{2\cdot k\cdot s_p\cdot N_{TCS}}{N_{FFT}}\right)\right),$$
$$k = 0, 1, \ldots, N_{RP} - 1; n = 0, 1, 2$$

[Equation 16]

In Equation 16, p is an index of a ranging preamble code which is determined by being cyclic shifted from a padded ZC sequence having a root index $r_p$ and which constitutes a basic unit of a ranging channel. $r_p$ can be defined by Equation 17.

$$\left. \begin{array}{l} r_p = \mathrm{mod}((1 - 2\cdot\mathrm{mod}(\lfloor p/M \rfloor, 2))\cdot(\lfloor p/M/2 \rfloor + r_0) + 211, 211) \\ s_p = \mathrm{mod}(p, M) \\ p = 0, 1, \ldots, N_{TOTAL} - 1 \end{array} \right\}$$

[Equation 17]

In Equation 17, a $p^{th}$ ranging preamble code is determined by using a root index $r_p$ determined from a start root index $r_0$. $r_0$ can be broadcast by the BS. Alternatively, it can be determined as $r_0 = 6*k_s + 1 (= 1, 7, 13, \ldots, 37)$, where $k_s$ is a cell-specific value broadcast through the S-SFH. M denotes the number of cyclic shifted codes per root index of the ZC sequence, and can be defined as $M = 1/G$. $N_{TOTAL}$ denotes the total number of periodic ranging preamble codes per sector. The number of periodic ranging preamble codes per sector can be indicated by ranging preamble code information broadcast through the S-SFH, and can be determined by Table 6.

$N_{TCS}$ is a cyclic shift unit per OFDM symbol based on a CP length, and can be defined as $N_{TCS} = G*N_{FFT}$. G and $N_{FFT}$ can be defined by Table 1. $N_{RP}$ is a length of the ranging preamble code, and can be defined as $N_{RP} = 72$ in the present embodiment.

If a delay time of signal reception is less than the CP length, a delay spread does not significantly deteriorate orthogonality between subcarriers. However, in the periodic ranging channel, if the cyclic shift unit is equal to the CP length and a code transmitted from an MS not having a reception delay is received simultaneously with a code transmitted from an MS of which a reception delay time is equal to the CP length, a correlation peak of the two codes concurrently occurs.

Figure 13:
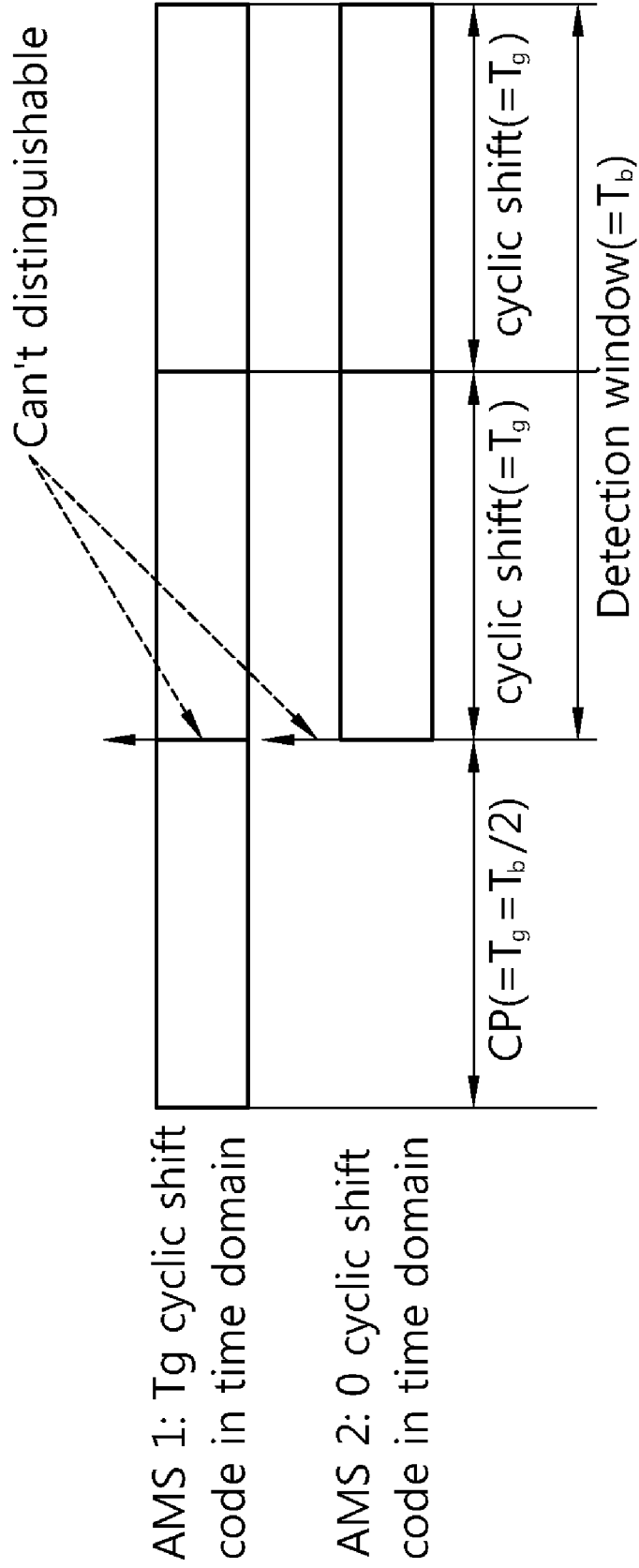
FIG. 13 shows an example of a case where a correlation peak of codes transmitted by two MSs concurrently occurs.

FIG. 13 shows an example of a case where a correlation peak of codes transmitted by two MSs concurrently occurs.

Referring to FIG. 13, an advanced mobile station (AMS) 2 transmits a code which is not cyclic shifted from a specific root index, and a BS receives the code with a delay Tg. An AMS 1 transmits a code which is cyclic shifted by Tg, and the BS receives the code without any delay. A correlation peak between the code transmitted from the AMS 1 and the code transmitted from the AMS 2 concurrently occurs, and the BS cannot distinguish the codes transmitted from the two AMSs. To prevent this, when applying a cyclic shift in periodic ranging, a cyclic shift unit can be determined to at least a double of the CP length. That is, it can be determined as α=2.

Equation 18 is another example of the ranging preamble code according to the proposed ranging preamble code generation method. The ranging preamble code of Equation 18 is based on a ZC sequence cyclic shifted in a time domain and defined in a frequency domain.

$$x_p(k) = \exp\left(-j\frac{\pi r_p k(k+1)}{N_{ZC}}\right)\exp\left(-j\frac{2\pi\cdot k\cdot s\cdot N_{CS}}{N_{RP}}\right),$$
$$k = 0, 1, \ldots, N_{RP}$$

[Equation 18]

In Equation 18, p denotes an index of a candidate ranging preamble code determined at an $s_p^{th}$ cyclic shift by $N_{CS}$ from a ZC sequence with a root index $r_p$. $r_p$ and $s_p$ can be defined by Equation 19.

$$\left. \begin{array}{l} r_p = \mathrm{mod}((1 - 2\cdot\mathrm{mod}(\lfloor p/M \rfloor, 2))\cdot(\lfloor p/M/2 \rfloor + r_0), N_{RP}) \\ s_p = \mathrm{mod}(p, M) \\ p = 0, 1, \ldots, N_{TOTAL} - 1 \end{array} \right\}$$

[Equation 19]

A ranging preamble code having an index p is determined by using a root index $r_p$ determined from a start root index $r_0$ and an $s_p^{th}$ cyclic shift. $r_0$ can be broadcast by the BS. Alternatively, it can be determined as $r_0=2*k_s+1(=1, 3, 5, \ldots, 33)$, where $k_s$ is a cell-specific value broadcast through an S-SFH. M denotes the number of cyclic shifted codes per root index of the ZC sequence, and it is determined as $M=\lfloor N_{RP}/N_{CS} \rfloor$. $N_{RP}$ is a length of the ranging preamble code, and may be a value obtained by adding 1 to $N_{ZC}$ which is a length of the ZC sequence. For example, if $N_{ZC}=71$, $N_{RP}=72$.

$N_{CS}$ is a cyclic shift unit, and is determined as $N_{CS}=\lceil \alpha \cdot G \cdot N_{RP} \rceil$. G denotes a CP ratio, and $\alpha$ can be determined to any integer. For example, it can be determined as $\alpha=1$ or $\alpha=2$ or $\alpha=1.5$. Alternatively, when a macro cell and a femto cell co-exist, the cyclic shift unit of the femto cell can be set to a value smaller than the cyclic shift unit of the macro cell. For example, $\alpha=2$ in the macro cell, and $\alpha=1$ in the femto cell.

$N_{TOTAL}$ denotes the total number of ranging preamble codes per sector. In case of the femto cell, $N_{TOTAL}$ can be denoted by a sum of $N_{IN}$ which is the number of initial access ranging preamble codes, $N_{HO}$ which is the number of handover ranging preamble codes, and $N_{PE}$ which is the number of periodic ranging preamble codes.

The number of periodic ranging preamble codes can be indicated by ranging preamble code information broadcast through the S-SFH. The number of periodic ranging preamble codes can be determined by Table 6.

In addition, $N_{CS}$ can be determined to a fixed value based on a value less than $N_{RP}$, instead of being determined to $N_{RP}$. This can be applied to a case where a long code is mapped to a plurality of OFDM symbols.

Equation 20 is another example of the ranging preamble code according to the proposed ranging preamble code generation method. The ranging preamble code generated by Equation 20 is obtained by applying a cyclic shift for a full code length.

$$x_p(k) = \exp\left(-j \cdot \pi \frac{r_p \cdot k \cdot (k+1) + 2 \cdot k \cdot s_p \cdot N_{CS}}{N_{RP} - 3}\right), \quad \text{[Equation 20]}$$
$$k = 0, 1, \ldots, N_{RP} - 1$$

In Equation 20, p denotes an index of a candidate ranging preamble code determined at an $s_p^{th}$ cyclic shift by $N_{CS}$ from a ZC sequence with a root index $r_p$. $N_{RP}$ is a length of the ranging preamble code, and can be determined as $N_{RP}=214$. $N_{CS}$ is a cyclic shift unit, and is determined as $N_{CS}=\lceil \alpha \cdot G \cdot N_{RP} \rceil$. G denotes a CP ratio, and $\alpha$ is any integer. For example, it can be determined as $\alpha=1$ or $\alpha=2$ or $\alpha=1.5$.

Equation 21 and Equation 22 are another example of the ranging preamble code according to the proposed ranging preamble code generation method. The ranging preamble code of Equation 21 and Equation 22 is generated at the $s_p^{th}$ cyclic shift by $N_{CS}$ from a padded ZC sequence having a root index $r_p$.

$$x_p(k) = \begin{cases} \exp\left(-j \cdot \pi \frac{r_p \cdot k \cdot (k+1)}{N_{RP} - 5}\right) \cdot \\ \exp\left(-j \cdot \pi \frac{2 \cdot k \cdot s_p \cdot N_{CS}}{U_{CS2}}\right), & k = 0, 1, \ldots, 73-1 \\ \exp\left(-j \cdot \pi \frac{r_p \cdot k \cdot (k+1)}{N_{RP} - 5}\right) \cdot \\ \exp\left(-j \cdot \pi \frac{2 \cdot \mathrm{mod}(k, U_{CS1}) \cdot s_p \cdot N_{CS}}{U_{CS2}}\right), & k = 72, 73, \ldots, 144-1 \\ \exp\left(-j \cdot \pi \frac{r_p \cdot k \cdot (k+1)}{N_{RP} - 5}\right) \cdot \\ \exp\left(-j \cdot \pi \frac{2 \cdot \mathrm{mod}(k, U_{CS1}) \cdot s_p \cdot N_{CS}}{U_{CS2}}\right), & k = 144, 145, \ldots, N_{RP} - 1 \end{cases}$$

[Equation 21]

In Equation 21, it can be determined as $N_{RP}=216$, $U_{CS1}=72$, and $U_{CS2}=72$.

$$x_p(k) = \exp\left(-j \cdot \pi \frac{r_p \cdot k \cdot (k+1)}{N_{RP} - 5}\right) \cdot \quad \text{[Equation 22]}$$

$$\exp\left(-j \cdot \pi \frac{2 \cdot \mathrm{mod}(k, U_{CS1}) \cdot s_p \cdot N_{CS}}{U_{CS2}}\right),$$

$$k = 0, 1, \ldots, N_{RP} - 1$$

$$= \exp\left(\begin{array}{c} -j \cdot \pi \frac{r_p \cdot k \cdot (k+1)}{N_{RP} - 5} - \\ \frac{2 \cdot \mathrm{mod}(k, U_{CS1}) \cdot s_p \cdot N_{CS}}{U_{CS2}} \end{array}\right),$$

$$k = 0, 1, \ldots, N_{RP} - 1$$

Equation 22 is a modification of Equation 21. In Equation 22, it can be determined as $N_{RP}=216$, $U_{CS1}=72$, and $U_{CS2}=72$.

In addition, in Equation 21 or Equation 22, $U_{SC1}$ and $U_{SC2}$ can be determined to different values with each other. For example, it can be determined as $U_{SC1}=71$ and $U_{SC2}=72$. $N_{CS}$ is a cyclic shift unit, and is determined as $N_{CS}=\lceil \alpha \cdot G \cdot N_{RP} \rceil$. G denotes a CP ratio, and $\alpha$ may be any integer. For example, it can be determined as $\alpha=1$ or $\alpha=2$ or $\alpha=1.5$.

Equation 23 and Equation 24 are another example of the ranging preamble code according to the proposed ranging preamble code generation method. The ranging preamble code of Equation 23 and Equation 24 is generated at the $s_p^{th}$ cyclic shift by $N_{CS}$ from a padded ZC sequence having a root index $r_p$.

$$x_p(k) = \begin{cases} \exp\left(-j \cdot \pi \dfrac{r_p \cdot k \cdot (k+1)}{N_{RP} - 3}\right) \cdot \\ \exp\left(-j \cdot \pi \dfrac{2 \cdot k \cdot s_p \cdot N_{CS}}{U_{CS2}}\right), & k = 0, 1, \ldots, 73 - 1 \\ \exp\left(-j \cdot \pi \dfrac{r_p \cdot k \cdot (k+1)}{N_{RP} - 3}\right) \cdot \\ \exp\left(-j \cdot \pi \dfrac{2 \cdot \text{mod}(k, U_{CS1}) \cdot s_p \cdot N_{CS}}{U_{CS2}}\right), & k = 72, 73, \ldots, 144 - 1 \\ \exp\left(-j \cdot \pi \dfrac{r_p \cdot k \cdot (k+1)}{N_{RP} - 3}\right) \cdot \\ \exp\left(-j \cdot \pi \dfrac{2 \cdot \text{mod}(k, U_{CS1}) \cdot s_p \cdot N_{CS}}{U_{CS2}}\right), & k = 144, 145, \ldots, N_{RP} - 1 \end{cases}$$

[Equation 23]

In Equation 23, it can be determined as $N_{RP}=214$, $U_{CS1}=71$, and $U_{CS2}=71$.

$$\begin{aligned} x_p(k) &= \exp\left(-j \cdot \pi \dfrac{r_p \cdot k \cdot (k+1)}{N_{RP} - 3}\right) \cdot \\ &\quad \exp\left(-j \cdot \pi \dfrac{2 \cdot \text{mod}(k, U_{CS1}) \cdot s_p \cdot N_{CS}}{U_{CS2}}\right), \\ &\quad k = 0, 1, \ldots, N_{RP} - 1 \\ &= \exp\left(\begin{array}{c} -j \cdot \pi \dfrac{r_p \cdot k \cdot (k+1)}{N_{RP} - 3} + \\ \dfrac{2 \cdot \text{mod}(k, U_{CS1}) \cdot s_p \cdot N_{CS}}{U_{CS2}} \end{array}\right), \\ &\quad k = 0, 1, \ldots, N_{RP} - 1 \end{aligned}$$

[Equation 24]

Equation 24 is a modification of Equation 23. In Equation 24, it can be determined as $N_{RP}=214$, $U_{CS1}=71$, and $U_{CS2}=71$.

In addition, in Equation 23 or Equation 24, $U_{SC1}$ and $U_{SC2}$ can be determined to different values with each other. For example, it can be determined as $U_{SC1}=72$ and $U_{SC2}=71$. $N_{CS}$ is a cyclic shift unit, and is determined as $N_{CS} = \lceil \alpha \cdot G \cdot N_{RP} \rceil$. $G$ denotes a CP ratio, and $\alpha$ may be any integer. For example, it can be determined as $\alpha=1$ or $\alpha=2$ or $\alpha=1.5$.

Figure 14:
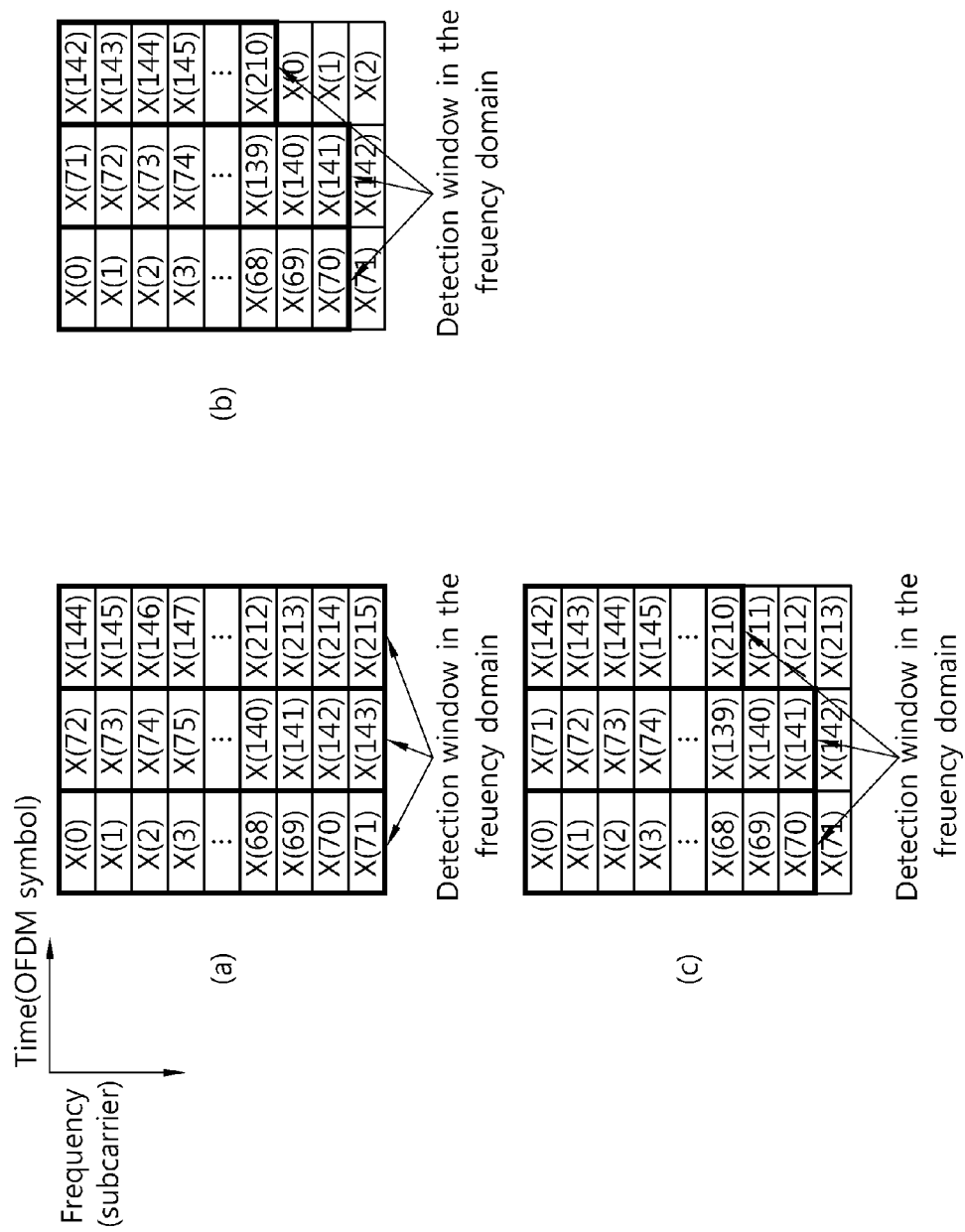
FIG. 14 shows an example of mapping a ranging preamble code according to the proposed ranging preamble code generation method.

FIG. 14 shows an example of mapping a ranging preamble code according to the proposed ranging preamble code generation method. FIG. 14-(*a*) shows an example of mapping a ranging preamble code generated by Equation 21 or Equation 22. A ranging preamble code having a length of 216 is mapped across 3 OFDM symbols. FIG. 14-(*b*) and FIG. 14-(*c*) show an example of mapping a ranging preamble code generated by Equation 23 or Equation 24. A ranging preamble code having a length of 214 is mapped across 3 OFDM symbols. Since $U_{CS2}=71$, the ranging preamble code is mapped in a unit of 71 in each OFDM symbol.

Figure 15:
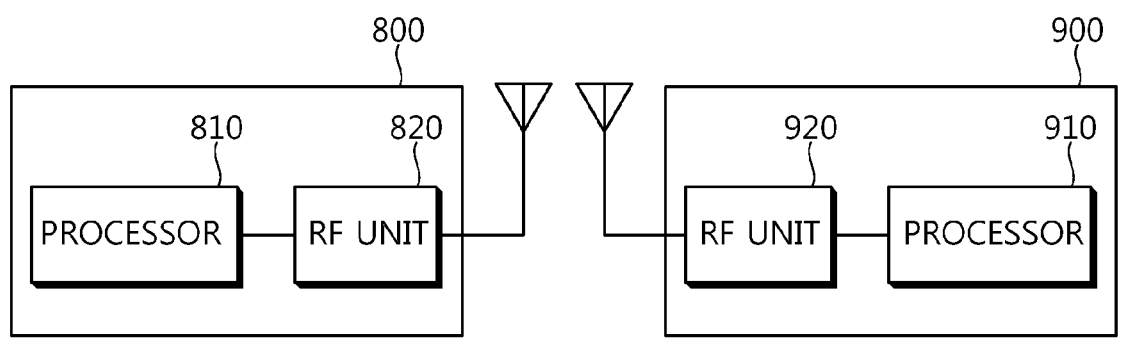
FIG. 15 is a block diagram of a BS and an MS for implementing an embodiment of the present invention.

FIG. 15 is a block diagram of a BS and an MS for implementing an embodiment of the present invention.

A BS 800 includes a processor 810 and a radio frequency (RF) unit 820. The processor 810 is coupled to the RF unit 820, and configures ranging channel information. The RF unit 820 transmits the ranging channel information to an MS 900.

The MS 900 includes a processor 910 and an RF unit 920. The MS 900 implements the embodiment of FIG. 10. The RF unit 920 transmits and/or receives a radio signal. The processor 910 is coupled to the RF unit 920 and generates one of a plurality of ranging preamble codes. The plurality of ranging preamble codes are based on a padded ZC sequence to which a cyclic shift is applied in a unit of $N_{CS}$, and $N_{CS}$ may be a function of a CP length. The padded ZC sequence to which a cyclic shift is applied can be generated by Equation 10 to Equation 24.

According to the present invention, the number of available ranging preamble codes in a ranging channel can be increased while avoiding inter-cell interference or intra-cell interference. Therefore, a signaling overhead can be avoided.

The present invention can be implemented using hardware, software, or a combination of them. In the hardware implementations, the present invention can be implemented using an application specific integrated circuit (ASIC), a digital signal processor (DSP), a programmable logic device (PLD), a field programmable gate array (FPGA), a processor, a controller, a microprocessor, other electronic unit, or a combination of them, which is designed to perform the above-described functions. In the software implementations, the present invention can be implemented using a module performing the above functions. The software can be stored in a memory unit and executed by a processor. The memory unit or the processor can use various means which are well known to those skilled in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of generating a ranging preamble code in a wireless communication system, the method comprising:
generating one of a plurality of ranging preamble codes, wherein the plurality of ranging preamble codes are based on a padded Zadoff-Chu (ZC) sequence to which a cyclic shift is applied in a unit of $N_{CS}$, where said $N_{CS}$ is a function of a cyclic prefix (CP) length in a time domain, wherein the cyclic shift applied to the padded ZC sequence is determined by the following equation:

$$\exp\left(-j\frac{2\pi \cdot k \cdot s_p \cdot N_{CS}}{N_{FFT}}\right), k = 0, 1, \ldots, N_{RP}-1,$$

where $s_p$ is a cyclic shift index per root index, $N_{FFT}$ is a fast Fourier transform (FFT) size depending on a bandwidth, and $N_{RP}$ is a length of the padded ZC sequence.

2. The method of claim 1, wherein said $N_{CS}$ is determined by the following equation:

$$N_{CS}=G*N_{FFT},$$

where G is a CP ratio which is a ratio of the CP length to a useful symbol duration.

3. The method of claim 2, wherein said G is one of ¼, ⅛, and ¹⁄₁₆ according to a frame structure.

4. The method of claim 2, wherein said $N_{FFT}$ is one of 512, 1024, and 2048 according to a bandwidth size.

5. The method of claim 1, wherein said $N_{CS}$ is equal to the CP length.

6. The method of claim 1, wherein said ranging preamble code with an index p among the plurality of ranging preamble codes is determined by the following equation:

$$x_p(n,k) = \exp\left(-j\cdot\pi\left(\frac{r_p(71\cdot n+k)(71\cdot n+k+1)}{211} + \frac{2\cdot k\cdot s_p\cdot N_{CS}}{N_{FFT}}\right)\right),$$
$$k=0,1,\ldots,N_{RP}-1; n=0,1,2$$

where $r_p$ is a root index of the padded ZC sequence.

7. The method of claim 1, wherein the length of the padded ZC sequence is either 214 or 216.

8. The method of claim 1, further comprising receiving the ranging preamble code information,
wherein the ranging preamble code information indicates the number of periodic ranging preamble codes.

9. The method of claim 8, wherein the ranging preamble code information is broadcast.

10. The method of claim 1, further comprising transmitting the generated one of the plurality of ranging preamble codes to a base station through a ranging channel.

11. The method of claim 10, wherein the ranging channel includes 6 orthogonal frequency division multiplexing (OFDM) symbols and 72 consecutive subcarriers in a ranging subframe.

12. The method of claim 10, wherein the generated one of the plurality of ranging preamble codes is mapped and repeated across 3 OFDM symbols in a ranging channel.

13. An apparatus for generating a ranging preamble code in a wireless communication system, the apparatus comprising:
a radio frequency (RF) unit; and
a processor, coupled to the RF unit, and configured to generate one of a plurality of ranging preamble codes,
wherein the plurality of ranging preamble codes are based on a padded Zadoff-Chu (ZC) sequence to which a cyclic shift is applied in a unit of $N_{CS}$, where said $N_{CS}$ is a function of a cyclic prefix (CP) length in a time domain, wherein the cyclic shift applied to the padded ZC sequence is determined by the following equation:

$$\exp\left(-j\frac{2\pi\cdot k\cdot s_p\cdot N_{CS}}{N_{FFT}}\right), k=0,1,\ldots,N_{RP}-1,$$

where $s_p$ is a cyclic shift index per root index, $N_{FFT}$ is a fast Fourier transform (FFT) size depending on a bandwidth, and $N_{RP}$ is a length of the padded ZC sequence.

14. The apparatus of claim 13, wherein said $N_{CS}$ is determined by the following equation:

$$N_{CS}=G*N_{FFT},$$

where G is a CP ratio which is a ratio of the CP length to a useful symbol duration.

15. The apparatus of claim 14, wherein said G is one of ¼, ⅛, and ¹⁄₁₆ according to a frame structure.

16. The apparatus of claim 14, wherein said $N_{FFT}$ is one of 512, 1024, and 2048 according to a bandwidth size.

17. The apparatus of claim 13, wherein said $N_{CS}$ is equal to the CP length.

18. The apparatus of claim 13, wherein said ranging preamble code with an index p among the plurality of ranging preamble codes is determined by the following equation:

$$x_p(n,k)=\exp\left(-j\cdot\pi\left(\frac{r_p(71\cdot n+k)(71\cdot n+k+1)}{211}+\frac{2\cdot k\cdot s_p\cdot N_{CS}}{N_{FFT}}\right)\right),$$
$$k=0,1,\ldots,N_{RP}-1; n=0,1,2$$

where $r_p$ is a root index of the padded ZC sequence.

* * * * *